(12) United States Patent
Kong et al.

(10) Patent No.: US 12,301,333 B2
(45) Date of Patent: May 13, 2025

(54) CONTROL METHOD FOR VEHICLE SYSTEM

(71) Applicant: SZ DJI TECHNOLOGY CO., LTD., Shenzhen (CN)

(72) Inventors: Shichao Kong, Shenzhen (CN); Xuke Wu, Shenzhen (CN); Liang Zhao, Shenzhen (CN); Hao Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 491 days.

(21) Appl. No.: 17/648,258

(22) Filed: Jan. 18, 2022

(65) Prior Publication Data

US 2022/0135222 A1 May 5, 2022

Related U.S. Application Data

(63) Continuation of application No. PCT/CN2019/096844, filed on Jul. 19, 2019.

(51) Int. Cl.
| | | |
|---|---|---|
| H04B 7/185 | (2006.01) | |
| H04W 56/00 | (2009.01) | |
| H04W 74/08 | (2024.01) | |
| H04W 74/0808 | (2024.01) | |
| H04W 36/00 | (2009.01) | |

(52) U.S. Cl.
CPC ...... *H04B 7/18506* (2013.01); *H04W 56/001* (2013.01); *H04W 74/0808* (2013.01); *B64U 2201/20* (2023.01); *H04W 36/035* (2023.05)

(58) Field of Classification Search
CPC ............ B64C 39/024; H04B 7/18506; H04W 56/001; H04W 74/0808
See application file for complete search history.

(56) References Cited

U.S. PATENT DOCUMENTS

| | | |
|---|---|---|
| 2017/0086112 A1 | 3/2017 | Xue et al. |
| 2017/0215178 A1 | 7/2017 | Kim et al. |
| 2018/0077617 A1 | 3/2018 | Xue et al. |
| 2018/0375568 A1 | 12/2018 | De et al. |
| 2021/0065566 A1 * | 3/2021 | Li ........................... H04W 4/50 |
| 2021/0314112 A1 * | 10/2021 | Balasubramanian ... H04L 5/001 |

(Continued)

FOREIGN PATENT DOCUMENTS

| | | |
|---|---|---|
| CN | 103543752 A | 1/2014 |
| CN | 106537972 A | 3/2017 |

(Continued)

OTHER PUBLICATIONS

The World Intellectual Property Organization (WIPO) International Search Report for PCT/CN2019/096844 Apr. 23, 2020 4 Pages.

*Primary Examiner* — Alpus Hsu
(74) *Attorney, Agent, or Firm* — ANOVA LAW GROUP, PLLC

(57) ABSTRACT

A method for controlling a first unmanned vehicle system includes determining whether each of a plurality of working channels is occupied by one of one or more second unmanned vehicle systems to obtain states of the plurality of working channels, and outputting the states of the plurality of working channels via a control terminal of the first unmanned vehicle system. Each of the states includes an occupied state or an idle state.

19 Claims, 16 Drawing Sheets

(56) References Cited

U.S. PATENT DOCUMENTS

| | | | |
|---|---|---|---|
| 2022/0279355 A1* | 9/2022 | Roy | H04W 12/50 |
| 2022/0322439 A1* | 10/2022 | Baek | H04W 74/0808 |
| 2022/0369363 A1* | 11/2022 | Ferdi | B64C 39/024 |

FOREIGN PATENT DOCUMENTS

| | | | |
|---|---|---|---|
| CN | 107968692 A | 4/2018 | |
| CN | 108029046 A | 5/2018 | |
| CN | 108445909 A | 8/2018 | |
| CN | 108632831 A | 10/2018 | |
| CN | 108873926 A | 11/2018 | |
| CN | 109361448 A | 2/2019 | |
| CN | 109412721 A | 3/2019 | |
| EP | 3654126 A1 | 5/2020 | |
| JP | 20140171140 A | 9/2014 | |
| JP | 20180533275 A | 11/2018 | |
| WO | 2019033948 A1 | 2/2019 | |

* cited by examiner

CONTROL METHOD FOR VEHICLE SYSTEM

CROSS-REFERENCE TO RELATED APPLICATION

This application is a continuation of International Application No. PCT/CN2019/096844, filed Jul. 19, 2019, the entire content of which is incorporated herein by reference.

TECHNICAL FIELD

The present disclosure relates to wireless communication technology and, more particularly, to an unmanned vehicle system and a method for controlling the unmanned vehicle system.

BACKGROUND

Data (e.g., images and remote-control instructions) is transmitted between an unmanned aerial vehicle (UAV) and a ground station via a wireless channel. When multiple unmanned aerial vehicles (UAVs), for example, first person view (FPV) racing UAVs, operate at a same airspace, wireless signals of the multiple UAVs interfere with each other, thereby causing image transmission to be failed and even the UAVs to be crashed.

To avoid channel interference, a fixed channel configuration or planning is generally preset using a computer. The multiple UAVs can perform the image transmission on different channels that have been allocated in advance. However, a dynamic configuration is not achieved. If the channel configuration needs to be changed, a re-configuration process is cumbersome and a coordination efficiency of the multiple UAVs is very low. The channel configuration is generally determined through verbal communication and coordination of the users of the multiple UAVs. As such, problems, such as the users are not clear about actual occupation states of the channels, a channel change situation is not tracked in time by the users, an inability to communicate or a low communication efficiency occurs, when the distance between users is far, are exist.

Conventionally, the dynamic configuration is achieved by deploying a wireless base station in an operating site and utilizing a centralized management mode. The channel configuration is notified to the UAVs wirelessly via the wireless base station. However, deploying the wireless base station is complicated and costly. Most UAV flight shows and competitions do not support deploying the wireless base station due to the constraints of the site and cost.

Therefore, a simple and low-cost channel management method supporting dynamic channel adjustment and coordination is urgently needed.

SUMMARY

In accordance with the disclosure, there is provided a method for controlling a first unmanned vehicle system including determining whether each of a plurality of working channels is occupied by one of one or more second unmanned vehicle systems to obtain states of the plurality of working channels, and outputting the states of the plurality of working channels via a control terminal of the first unmanned vehicle system. Each of the states includes an occupied state or an idle state.

Also in accordance with the disclosure, there is provided a method for controlling the first unmanned vehicle system including determining an occupied working channel occupied by an occupying unmanned vehicle system as a target channel, transmitting a preemption message to the occupying unmanned vehicle system, and switching a wireless communication link of the first unmanned vehicle system to the target channel. The occupying unmanned vehicle system is one of one or more second unmanned vehicle systems. The preemption message requests the occupying unmanned vehicle system to exit the target channel.

Also in accordance with the disclosure, there is provided a method for controlling the second unmanned vehicle system including receiving the preemption message from the first unmanned vehicle system, and outputting, in response to the preemption message, a preemption notification via a control terminal of the second unmanned vehicle system. The preemption message requests the second unmanned vehicle system occupying the target channel to exit the target channel.

Also in accordance with the disclosure, there is provided a system including one or more processors and one or more memories coupled to the one or more processors. The one or more memories storing instructions that, when executed by the one or more processors, cause the one or more processors to determine whether each of the plurality of working channels is occupied by one of the one or more second unmanned vehicle systems to obtain the states of the plurality of working channels, and output the states of the plurality of working channels via the control terminal of the first unmanned vehicle system. Each of the states includes the occupied state or the idle state.

Also in accordance with the disclosure, there is provided a system including one or more processors and one or more memories coupled to the one or more processors. The one or more memories storing instructions that, when executed by the one or more processors, cause the one or more processors to determine the occupied working channel occupied by the occupying unmanned vehicle system as the target channel, transmit the preemption message to the occupying unmanned vehicle system, and switch the wireless communication link of the first unmanned vehicle system to the target channel. The occupying unmanned vehicle system is one of the one or more second unmanned vehicle systems. The preemption message requests the occupying unmanned vehicle system to exit the target channel.

Also in accordance with the disclosure, there is provided a system including one or more processors and one or more memories coupled to the one or more processors. The one or more memories storing instructions that, when executed by the one or more processors, cause the one or more processors to receive the preemption message from the first unmanned vehicle system, and output, in response to the preemption message, the preemption notification via the control terminal of the second unmanned vehicle system. The preemption message requests the second unmanned vehicle system occupying the target channel to exit the target channel.

DETAILED DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Figure 1:
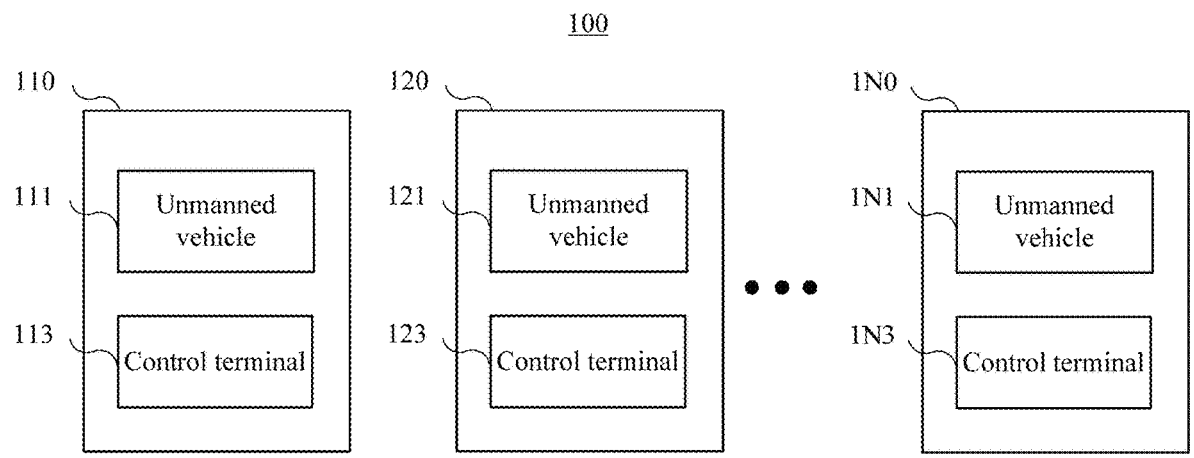
FIG. 1 is a schematic diagram of a multi-unmanned-vehicle network consistent with the disclosure.

FIG. 1 is a schematic diagram of an example multi-unmanned-vehicle network 100 consistent with the disclosure. As shown in FIG. 1, the multi-unmanned-vehicle network 100 includes a plurality of unmanned vehicle systems denoted as 110 to 1N0. In some embodiments, at least two of the plurality of unmanned vehicle systems can work at the same time. To avoid communication interferences among the plurality of unmanned vehicle systems, the plurality of unmanned vehicle systems can be dynamically allocated at different ones of a plurality of working channels.

Figure 2:
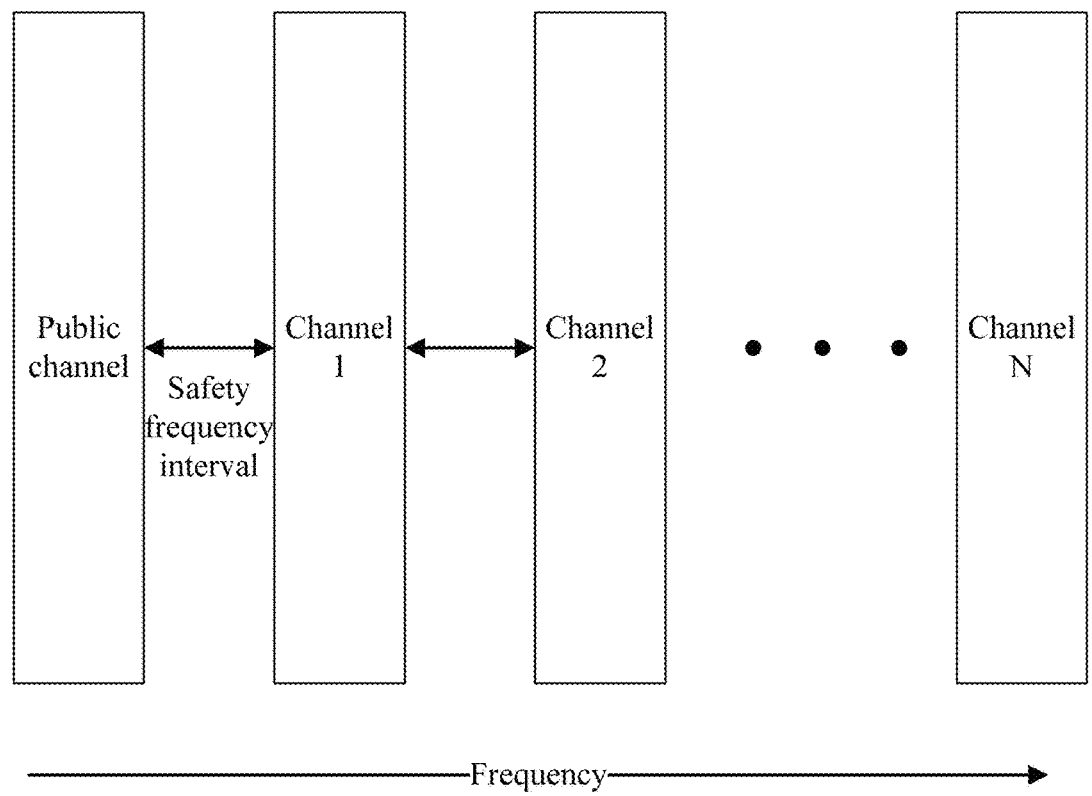
FIG. 2 is a schematic diagram of a channel planning for the multi-unmanned-vehicle network in FIG. 1 consistent with the disclosure.

FIG. 2 is a schematic diagram of an example channel planning for the multi-unmanned-vehicle network 100 consistent with the disclosure. As shown in FIG. 2, a working frequency band of the multi-unmanned-vehicle network 100 is divided into the plurality of working channels denoted as 1 to N. The number of the plurality of working channels may be not less than the number of the plurality of unmanned vehicle systems of the multi-unmanned-vehicle network 100. For example, the number of the plurality of unmanned vehicle systems is N as shown in FIG. 1, and the number of the plurality of working channels is equal to N as shown in FIG. 2.

The working frequency band of the multi-unmanned-vehicle network 100 can be any suitable frequency band, for example, radio frequency band, microwave band, millimeter-wave band, centimeter-wave band, optical wave band, or the like. In some embodiments, a frequency spacing is set between adjacent ones of the plurality of working channels to, e.g., prevent inter-channel interference. Such a frequency spacing can also be referred to as a "safety frequency spacing." The frequency spacing can be set according to the working frequency band of the multi-unmanned-vehicle network 100. For example, if the working frequency band of the multi-unmanned-vehicle network 100 is the radio frequency band, the frequency spacing can be about 25 kHz, about 20 kHz, about 12.5 kHz, or the like. As another example, if the working frequency band of the multi-unmanned-vehicle network 100 is the optical wave band, the frequency spacing can be about 25 GHz, about 50 GHz, about 100 GHz, or the like.

In some embodiments, as shown in FIG. 2, the plurality of working channels further include a public channel. For example, when one of the plurality of unmanned vehicle systems, e.g., the unmanned vehicle system 110, is powered on, the unmanned vehicle system 110 can be first allocated to the public channel instead of being directly allocated to a target channel of the unmanned vehicle system 100 (i.e., one of the plurality of working channels). If the target channel is occupied by another one of the plurality of unmanned vehicle systems, e.g., the unmanned vehicle system 130, directly allocating the unmanned vehicle system 110 to the target channel may cause communication interference between the unmanned vehicle system 110 and the unmanned vehicle system 130. As another example, when the target channel is occupied by the unmanned vehicle system 120 and the unmanned vehicle system 110 determines to preempt the target channel, the unmanned vehicle system 120 can be switched to the public channel before the unmanned vehicle system 110 is switched to the target channel, such that the communication interference between the unmanned vehicle system 110 and the unmanned vehicle system 120 can be avoided.

Referring again to FIG. 1, each of the plurality of unmanned vehicle systems includes an unmanned vehicle and a control terminal. For example, the unmanned vehicle system 110 includes an unmanned vehicle 111 and a control terminal 113, the unmanned vehicle system 120 includes an unmanned vehicle 121 and a control terminal 123, and the unmanned vehicle system 1N0 includes an unmanned vehicle 1N1 and a control terminal 1N3. In some embodiments, the public channel can be a peer-to-peer communication channel and the plurality of working channels denoted as 1 to N can be broadcast communication channels. For example, when the unmanned vehicle system 110 is in the public channel, the unmanned vehicle 111 can transmit communication signal in a peer-to-peer mode, e.g., only communicate with the corresponding control terminal 113. When the unmanned vehicle system 110 is in one of the plurality of working channels denoted as 1 to N, the unmanned vehicle 111 can transmit the communication signal in a broadcast mode. That is, one or more of the unmanned vehicles (e.g., the unmanned vehicle 121, the unmanned vehicle 1N1, and/or the like) and the control terminals (e.g., the control terminal 123 of the unmanned vehicle system 130, the control terminal 1N3 of the unmanned vehicle system 1N0, and/or the like) can be switched to a communication channel of the unmanned vehicle system 110 (i.e., one of the plurality of working channels denoted as 1 to N) and receive the communication signal from the unmanned vehicle 111 in the broadcast mode.

Figure 3:
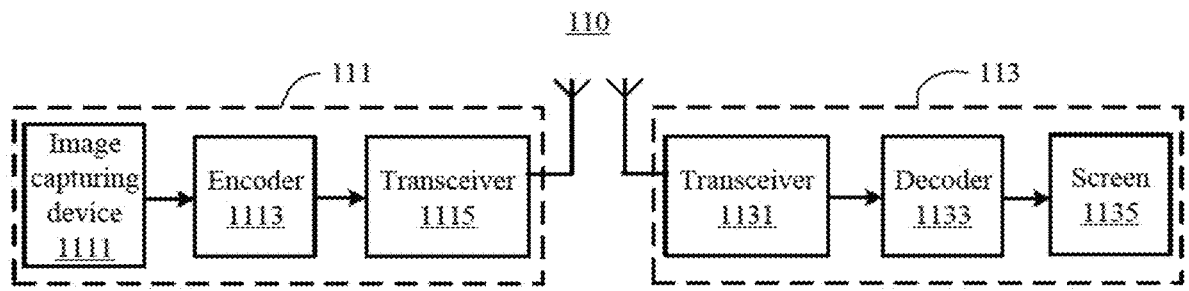
FIG. 3 is a schematic diagram of an unmanned vehicle system of the multi-unmanned-vehicle network in FIG. 1 consistent with the disclosure.

FIG. 3 is a schematic diagram of an example unmanned vehicle system of the multi-unmanned-vehicle network 100 consistent with the disclosure. Take the unmanned vehicle system 110 as an example, as shown in FIG. 3, the unmanned vehicle 111 includes an image capturing device 1111 configured to capture images, an encoder 1113 coupled to the image capturing device 1111 and configured to encode the captured images to generate encoded data, and a transceiver 1115 coupled to the encoder 1113. In some embodiments, the encoder 1113 can be bypassed or omitted at all, and the transceiver 1115 can be directly coupled to the image capturing device 1111.

In some embodiments, the image capturing device 1111 can include an image sensor. The image capturing device 1111 can also include a lens or a lens set. The image sensor can be, for example, an opto-electronic sensor, such as a charge-coupled device (CCD) sensor or a complementary metal-oxide-semiconductor (CMOS) sensor. The image capturing device 1111 can be further configured to send the captured images to the encoder 1113 for encoding. In some embodiments, the image capturing device 1111 can include a memory for storing, either temporarily or permanently, the captured images. The images may be still images, e.g., pictures, and/or moving images, e.g., videos. Hereinafter, the term "image" is used to refer to either a still image or a moving image.

In some embodiments, the encoder 1113 can support any suitable digital coding standard, such as Moving Picture Experts Group (MPEG, e.g., MPEG-1, MPEG-2, or MPEG-4), H.26x (e.g., H.261, H.262, H.263, or H.264), or the like, any suitable analog coding standard, such as SoftCast or the like, and/or any suitable HDA coding standard, such as WSVC or the like.

In some embodiments, the transceiver 1115 can include a transmitter and a receiver, and configured to have a two-way communication capability, i.e., can both transmit and receive data and/or the like. For example, the unmanned vehicle 111 can transmit image data to the control terminal 113 via the transmitter of the transceiver 1115, and receive control instructions from the control terminal 113 via the receiver of the transceiver 1115. In some embodiments, the transmitter and the receiver may share common circuitry. In some other embodiments, the transmitter and the receiver may be separate parts sharing a single housing.

In some embodiments, a communication channel of the transceiver 1115 can be switched to any one of the plurality of working channels in the working frequency band of the multi-unmanned-vehicle network 100 shown in FIG. 2. That is, a working frequency of the transceiver 1115 can be tuned to the working frequency of any one of the plurality of working channels. For example, the transceiver 1115 can receive indication information corresponding to the target channel from the control terminal 113. The transceiver 1115 can switch the communication channel to the target channel according to the indication information. As another example, the transceiver 1115 can store information of a last-used working channel. The last-used working channel refers to one of the plurality of working channels that is last used by the unmanned vehicle 111 before reboot, and the transceiver 1115 can switch the communication channel to the last-used working channel after the unmanned vehicle 111 is rebooted.

According to the disclosure, the image capturing device 1111, the encoder 1113, and the transceiver 1115 can be separate devices, or any two or more of them can be integrated in one device. In some embodiments, the image capturing device 1111, the encoder 1113, and the transceiver 1115 are separate devices that can be connected or coupled to each other. For example, the image capturing device 1111 can be a camera, a camcorder, or a smartphone having a camera function. The encoder 1113 can be an independent device including a processor and a memory and is coupled to the image capturing device 1111 and the transceiver 1115 through wired or wireless means. The transceiver 1115 can be an independent device combining transmitter/receiver in a single package.

In some other embodiments, any two of the image capturing device 1111, the encoder 1113, and the transceiver 1115 can be integrated in a same device. For example, the image capturing device 1111 and the encoder 1113 may be parts of a same device including a camera, a lens, a processor, and a memory. The processor can be any type of processor and the memory can be any type of memory. In this example, the device can further include an electrical interface (either wired or wireless) for coupling to the transceiver 1115.

In some other embodiments, the image capturing device 1111, the encoder 1113, and the transceiver 1115 can be integrated in a same electronic device. For example, the image capturing device 1111 may include an image sensor and a lens or a lens set of the electronic device. The encoder 1113 may be implemented by a single-chip encoder, a single-chip codec, an image processor, an image processing engine, or the like, which is integrated in the electronic device. The transceiver 1115 may be implemented by an integrated circuit, a chip, or a chipset that is integrated in the electronic device. For example, the electronic device may be a smartphone having a built-in camera and a motherboard that integrates the encoder 1113 and the transceiver 1115.

In some embodiments, the unmanned vehicle 111 can be a mobile object, for example, an unmanned aerial vehicle (UAV), a driverless car, a mobile robot, a driverless boat, a submarine, a spacecraft, a satellite, or the like. The image capturing device 1111, the encoder 1113, and the transceiver 1115 can be integrated in the unmanned vehicle 111. In some other embodiments, the image capturing device 1111, the encoder 1113, and the transceiver 1115 can be hosted payloads carried by the unmanned vehicle 111.

As shown in FIG. 3, the control terminal 113 includes a transceiver 1131, a decoder 1133 coupled to the transceiver 1131 and configured to decode received data, and a screen 1135 coupled to the decoder 1133. In some embodiments, the decoder 1133 can be bypassed or be omitted at all, and the screen 1135 can be directly coupled to the transceiver 1131.

In some embodiments, the transceiver 1131 can include a transmitter and a receiver, and configured to have the two-way communication capability, i.e., can both transmit and receive data and/or the like. For example, the control terminal 113 can receive the image data from the unmanned vehicle 111 via the receiver of the transceiver 1131, and transmit the control instructions to the unmanned vehicle 111 via the transmitter of the transceiver 1131. In some embodiments, the transmitter and the receiver may share common circuitry. In some other embodiments, the transmitter and the receiver may be separate parts sharing a single housing.

In some embodiments, a communication channel of the transceiver 1131 can be switched to any one of the plurality of working channels in the working frequency band of the multi-unmanned-vehicle network 100 shown in FIG. 2. That is, a working frequency of the transceiver 1131 can be tuned to the working frequency of any one of the plurality of working channels. For example, the transceiver 1131 can receive a selection input from a user and the selection input can include information of the target channel of the control terminal 113. The transceiver 1131 can switch the communication channel to the target channel in response to the selection input. As another example, the transceiver 1131 can store information of a last-used working channel. The last-used working channel refers to one of the plurality of working channels that is last used by the control terminal 113 before reboot, and the transceiver 1131 can switch the communication channel to the last-used working channel after the control terminal 113 is rebooted.

In some embodiments, the transceiver 1131 can have a preemption communication channel and configured to communicate with a transceiver of a control terminal of an occupying unmanned vehicle system, i.e., an unmanned vehicle system that is working at the target channel. The occupying unmanned vehicle system can be, for example, any of the unmanned vehicle systems 120 to 1N0. For example, the transceiver 1131 can transmit a preemption message to request the occupying unmanned vehicle system to exit the target channel and receive a feedback (e.g., a preemption-allowed-feedback, a preemption-forbidden-feedback, or the like) from the transceiver of a control terminal of an occupying unmanned vehicle system.

In some embodiments, the decoder 1133 can be configured to obtain the received data from the transceiver 1131 and decode the received data to recover the images captured by the image capturing device 1111. The decoder 1133 can support any digital coding standard that is employed in the encoder 1113, any analog coding standard that is employed in the encoder 1113, and/or any HDA coding standard that is employed in the encoder 1113.

In some embodiments, the screen 1135 can be configured to display the recovered images and/or other information (e.g., states of the plurality of working channels, for example, occupied states or idle states, a notification, for example, a preemption-allowed-notification or a preemption-forbidden-notification, or the like) to the user. In some embodiments, the screen 1135 can include a touch panel for receiving a user input, for example, the selection input indicating one of the plurality of working channel selected as the target channel of the unmanned vehicle system 110 by the user. The user can touch the screen 1135 with an external object, such as a finger of the user or a stylus. In some embodiments, the user can adjust image parameters, such as brightness, contrast, saturation, and/or the like, by touching the screen 1135. For example, the user can scroll vertically on the image to select a parameter, then swipe horizontally to change the value of the parameter. In some embodiments, the user can input the control command for controlling the unmanned vehicle 111 by touching the screen 1135. For example, the user can input a control command for controlling the unmanned vehicle 111 to start or stop capturing images.

According to the disclosure, the transceiver 1131, the decoder 1133, and the screen 1135 can be separate devices, or any two or more of them can be integrated in one device. In some embodiments, the transceiver 1131, the decoder 1133, and the screen 1135 are separate devices that can be connected or coupled to each other. For example, the transceiver 1131 can be an independent device combining transmitter/receiver in a single package. The decoder 1133 can be an independent device including the processor and the memory and coupled to the transceiver 1131 and the screen 1135. The screen 1135 can be a display device coupled to the transceiver 1131 and the decoder 1133 through wired or wireless means.

In some other embodiments, any two of the transceiver 1131, the decoder 1133, and the screen 1135 can be integrated in a same device. For example, the decoder 1133 and the screen 1135 may be parts of a same device including a processor, a memory, and a screen. The processor can be any type of processor and the memory can be any type of memory. The disclosure is not limited here. In this example, the device can further include an electrical interface (either wired or wireless) for coupling to the transceiver 1131.

In some other embodiments, the transceiver 1131, the decoder 1133, and the screen 1135 can be integrated in a same electronic device. For example, the transceiver 1131 may be implemented by an integrated circuit, a chip, or a chipset that is integrated in the electronic device. The decoder 1133 may be implemented by a single-chip decoder, a single-chip codec, an image processor, an image processing engine, or the like, which is integrated in the electronic device. For example, the electronic device may be a tablet having a screen and a motherboard that integrates the transceiver 1131 and the decoder 1133.

In some embodiments, the control terminal 113 can be a remote controller, a terminal device with an application (app) that can control the unmanned vehicle 111, or a device in which the control terminal 113 is integrated, such as a smartphone, a tablet, a game device, a smart glass, a smart watch, or the like.

The other ones of the plurality of unmanned vehicle system, e.g., 130 to 1N0, are similar to the unmanned vehicle system 110 shown in FIG. 3, and detailed description thereof is omitted herein.

Figure 4:
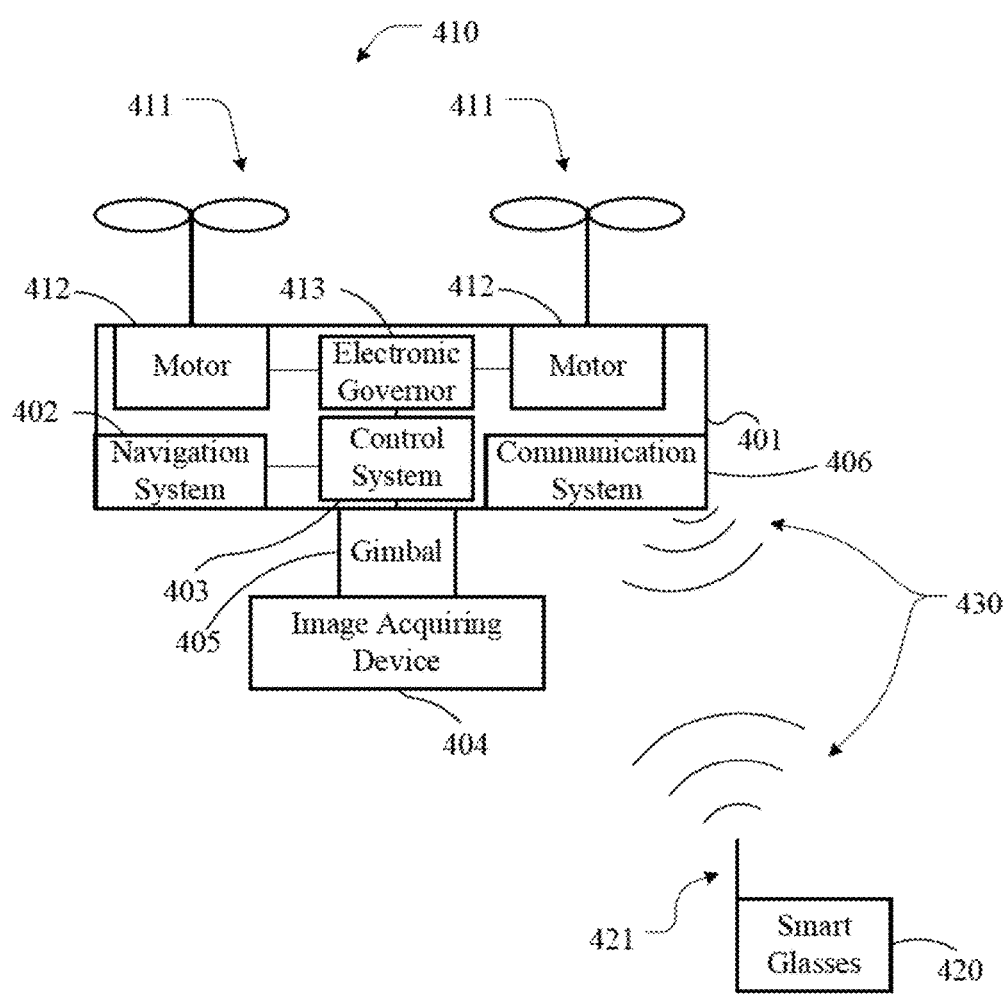
FIG. 4 is a schematic diagram of another unmanned vehicle system of multi-unmanned-vehicle network in FIG. 1 consistent with the disclosure.

FIG. 4 is a schematic diagram of another example unmanned vehicle system of the multi-unmanned-vehicle network 100 consistent with the disclosure. In this figure, an UAV system is taken as an example of the unmanned vehicle system 110. As shown in FIG. 4, the unmanned vehicle 111 is a UAV 410 and the control terminal 113 is smart glasses 420.

As shown in FIG. 4, the UAV 410 includes a vehicle body 401, a propulsion system, a navigation system 402, a control system 403, an image acquiring device 404, a gimbal 405, and a communication system 406. The propulsion system includes one or more propellers 411, one or more motors 412, and an electronic governor 413. The propulsion system can be provided at the vehicle body 401 for providing power for flight.

The navigation system 402 can include one or more of motion sensors (e.g., accelerometers), rotation sensors (e.g., gyroscopes), magnetic sensors (magnetometers), or the like. The navigation system 402 can be configured to detect a speed, an acceleration, and/or attitude parameters (such as pitch angle, roll angle, yaw angle, and/or the like) of the UAV 410, attitude parameters of the image acquiring device 404, and/or attitude parameters of the gimbal 405. The navigation system 402 can be provided inside or on the vehicle body 401 of the UAV 410.

The control system 403 is coupled to the navigation system 402, the electronic governor 413, and the gimbal 405. The control system 403 can be configured to control a flight attitude of the UAV 410 and/or a rotation of the gimbal 405 according the attitude parameters obtained by the navigation system 402. In some embodiments, the control system 403 can be coupled to the image acquiring device 404 and configured to control an attitude, such as a rotation, of the image acquiring device 404. The control system 403 can be provided inside the vehicle body 401 of the UAV 410.

The image acquiring device 404 is connected to the vehicle body 401 of the UAV 410 via the gimbal 405. In some embodiments, the image acquiring device 404 can be directly connected to the vehicle body 401 without the use of the gimbal 405. The image acquiring device 404 can be provided below or above the vehicle body 401 of the UAV 410. The image acquiring device 404 can include an image sensor and a lens or a lens set. The image acquiring device 404 is configured to capture the images. The image sensor can include, for example, an opto-electronic sensor, such as a charge-coupled device (CCD) sensor, a complementary metal-oxide-semiconductor (CMOS) sensor, or the like. The image acquiring device 404 can rotate along with the rotation of the gimbal 405, such that the image acquiring device 404 can perform a tracking shooting on a target object.

The communication system 406 can include a receiver and/or a transmitter. The receiver can be configured to receive wireless signals 430 transmitted by an antenna 421 of the smart glasses 420, and the communication system 406 can also send the wireless signals 430 (such as the encoded data, status information of the UAV, or the like) to the smart glasses 420. The communication system 406 can be similar to the transceiver 1115 described above. The communication system 406 can be provided inside or on the vehicle body 401 of the UAV 410.

The smart glasses 420 can include an optical head-mounted display (OHMD) for displaying the received images and/or other information (e.g., the states of the plurality of working channels, for example, the occupied states or the idle states, or the like) to the user.

In some embodiments, the smart glasses 420 can include an eye tracking circuit configured to track eye positions and eye movement of the user. In this example, an interaction between the user and the smart glasses 420 can be achieved by eye tracking. For example, each of the plurality of working channels can have a corresponding channel icon shown on the OHMD. The smart glasses 420 can obtain the selection input by detecting which channel icon the eyes are looking at. The one of the plurality of working channels corresponding to the channel icon that the eyes are looking at can be the target channel selected by the user.

In some embodiments, the smart glasses 420 can include a hand gesture recognition circuit configured to recognize the hand gestures of the user. In this example, the user input can include a hand gesture input. In some embodiments, the interaction between the user and the smart glasses 420 can be achieved by a combination of eye tracking and hand gesture.

In some embodiments, the smart glasses 420 can include a speech recognition circuit configured to perform a speech recognition. In this example, the user input can include a voice command. For example, the smart glasses 420 can receive the voice command from the user and parse content of the voice command via the speech recognition.

Figure 5:
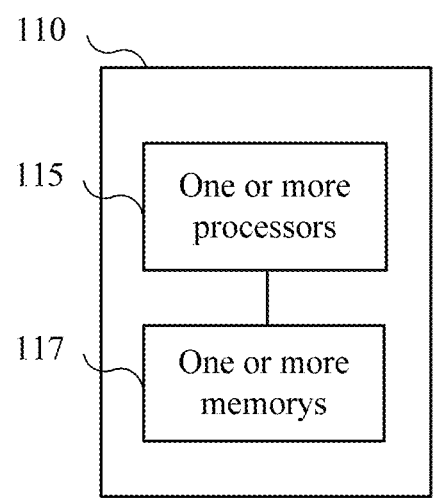
FIG. 5 is a schematic diagram of another unmanned vehicle system of multi-unmanned-vehicle network in FIG. 1 consistent with the disclosure.

FIG. 5 is a schematic diagram of another example unmanned vehicle system of the multi-unmanned-vehicle network 100 consistent with the disclosure. As shown in FIG. 5, the unmanned vehicle system 110 includes one or more processors 115 and one or more memories 117 coupled to the one or more processors 115.

The one or more processors 115 can include any suitable hardware processor, such as a microprocessor, a microcontroller, a central processing unit (CPU), a network processor (NP), a digital signal processor (DSP), an application specific integrated circuit (ASIC), a field-programmable gate array (FPGA), and/or another programmable logic device, discrete gate or transistor logic device, discrete hardware component. The one or more memories 117 can store computer program codes that, when executed by the one or more processors 115, cause the processor 115 to perform a method for controlling the unmanned vehicle system consistent with the disclosure, such as, one of the example methods for controlling the unmanned vehicle system described below.

In some embodiments, the one or more memories 117 can also store the images captured by the image capturing device 1111 and the encoded data. The one or more memories 117 can include one or more non-transitory computer-readable storage mediums, such as a random-access memory (RAM), a read only memory, a flash memory, a volatile memory, a hard disk storage, or an optical medium.

In some embodiments, the unmanned vehicle 111 can include at least one of the one or more processors 115 and at least one of the one or more memories 117, and the control terminal 113 can include the other one(s) of the one or more processors 115 and the other one(s) of the one or more memories 117.

The other ones of the plurality of unmanned vehicle system, e.g., 120 to 1N0, are similar to the unmanned vehicle system 110 shown in FIG. 5, and detailed description thereof is omitted herein.

Example methods for controlling an unmanned vehicle system consistent with the disclosure will be described in more detail below. A method for controlling the unmanned vehicle system consistent with the disclosure can be implemented in the unmanned vehicle system consistent with the disclosure, such as the unmanned vehicle system 110 of the multi-unmanned-vehicle network 100 described above.

Figure 6:
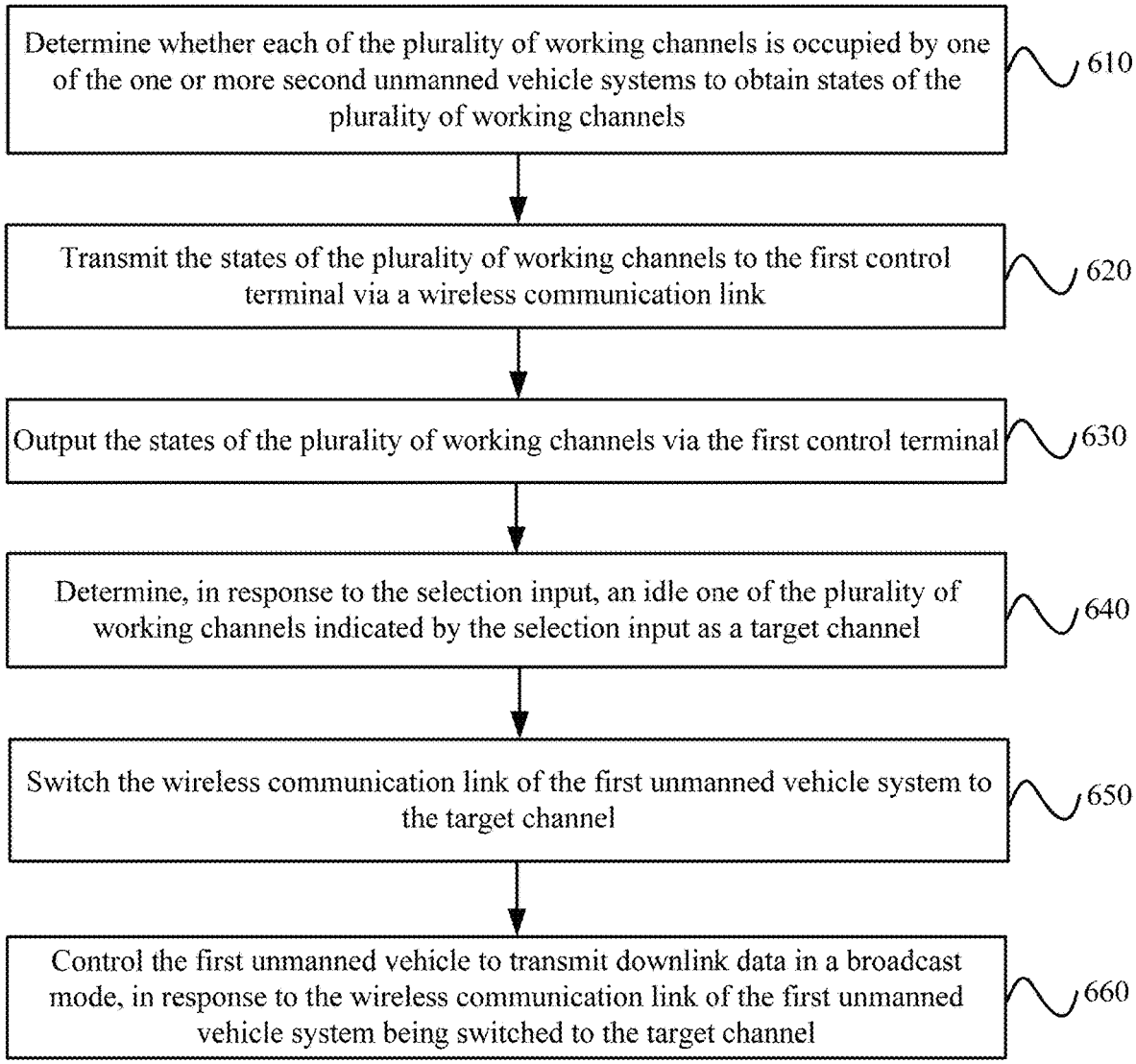
FIG. 6 is a schematic flow chart of a method for controlling an unmanned vehicle system consistent with the disclosure.

FIG. 6 is a schematic flow chart of an example method 600 for controlling the first unmanned vehicle system consistent with the disclosure. As shown in FIG. 6, at 610, a first unmanned vehicle system determines whether each of the plurality of working channels is occupied by one of one or more second unmanned vehicle systems to obtain the states of the plurality of working channels. Each of the states can include an occupied state or an idle state.

The first unmanned vehicle system can be any one of the plurality of unmanned vehicle systems of the multi-unmanned-vehicle network 100, for example, the unmanned vehicle system 110. The one or more second unmanned vehicle systems can refer to the plurality of unmanned vehicle systems of the multi-unmanned-vehicle network 100 other than the first unmanned vehicle system, for example, the unmanned vehicle systems 120 to 1N0.

A working channel having the idle state can indicate no unmanned vehicle system is using the working channel as the communication channel, and can be referred to as an idle working channel. A working channel having the occupied state can indicate one of the one or more second unmanned vehicle systems is using the working channel as the communication channel, and can be referred to as an occupied working channel.

In some embodiments, whether each of the plurality of working channels is occupied by one of the one or more second unmanned vehicle systems can be determined in response to detecting that the first unmanned vehicle system is powered on. For example, once being powered on, the first unmanned vehicle system can be allocated to the public channel, and either an unmanned vehicle of the first unmanned vehicle system, for example, the unmanned vehicle 111 of the unmanned vehicle system 110, or a control terminal of the first unmanned vehicle system, for example, the control terminal 113 of the unmanned vehicle system 110, can start to scan the plurality of working channels to determine the states of the plurality of working channels. Hereafter, the unmanned vehicle of the first unmanned vehicle system can be referred to as a first unmanned vehicle, and the control terminal of the first unmanned vehicle system can be referred to as a first control terminal.

In some other embodiments, whether each of the plurality of working channels is occupied by one of the one or more second unmanned vehicle systems can be determined in response to a state detection instruction. For example, the state detection instruction can be inputted to the first control terminal, e.g., the control terminal 113, by a user of the first unmanned vehicle system. The user of the first unmanned vehicle system can be referred to as a first user. The first control terminal can start to scan the plurality of working channels to determine the states of the plurality of working channels in response to receiving the state detection instruction. As another example, the first control terminal can send the state detection instruction to the first unmanned vehicle, e.g., the unmanned vehicle 111, via the public channel. The first unmanned vehicle can start to scan the plurality of working channels to determine the states of the plurality of working channels in response to receiving the state detection instruction.

Figure 7:
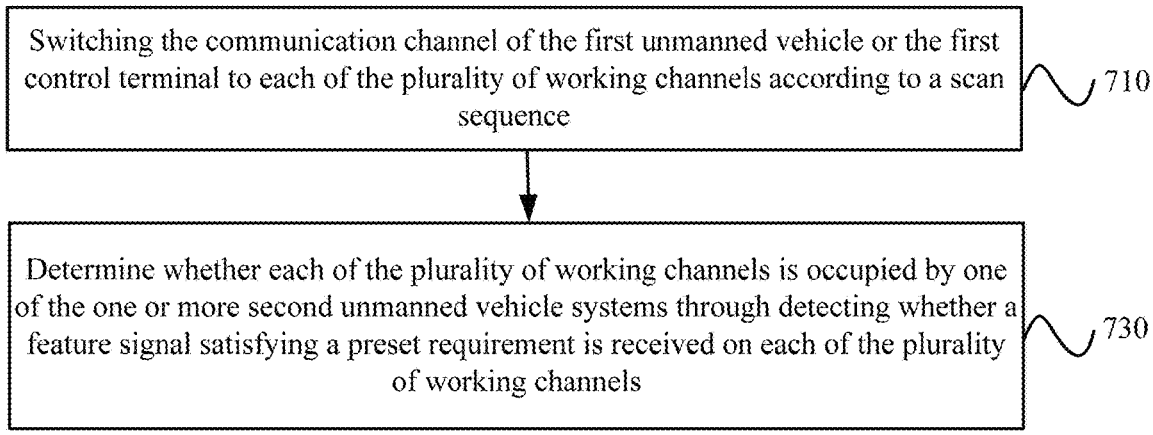
FIG. 7 is a schematic flow chart of scanning a plurality of working channels consistent with the disclosure.

FIG. 7 is a schematic flow chart of scanning the plurality of working channels consistent with the disclosure. As shown in FIG. 7, at 710, the communication channel of the first unmanned vehicle or the first control terminal is switched to each of the plurality of working channels according to a scan sequence. For example, the communication channel of the transceiver 1115 of the unmanned vehicle 111 can be switched to each of the plurality of working channels, and can receive communication signal on each of the plurality of working channels. As another example, the communication channel of the transceiver 1131 of the control terminal 113 can be switched to each of the plurality of working channels and can receive the communication signal on each of the plurality of working channels.

In some embodiments, the scan sequence can be preset and stored in the first unmanned vehicle or the first control terminal. For example, the scan sequence can be in a numerical order or an alphabetical order. In some other embodiments, the scan sequence can be inputted by the first user via the first control terminal.

At 730, whether each of the plurality of working channels is occupied by one of the one or more second unmanned vehicle systems is determined through detecting whether a feature signal satisfying a preset requirement is received on each of the plurality of working channels. In some embodiments, the communication signal received on each of the plurality of working channels can be detected to determine whether the communication signal received on each of the plurality of working channels includes the feature signal satisfying the preset requirement. In some embodiments, the feature signal refers to a predesigned sequence having a structure known by the first unmanned vehicle system and the one or more second unmanned vehicle systems. In some embodiments, the feature signal can include a pilot sequence. In some embodiments, to determine whether a communication signal received on a working channel is the feature signal, the communication signal can be used for attempted synchronization. If the synchronization is successful, it can be determined that the received communication signal is the feature signal. The feature signal can be sent by an unmanned vehicle (e.g., the unmanned vehicle 121) or a control terminal (e.g., the control terminal 123) of the occupying unmanned vehicle system. The occupying unmanned vehicle system can be one of the one or more second unmanned vehicle systems (e.g., the unmanned vehicle system 130) occupying one of the plurality of working channels.

For example, when the communication channel of the first unmanned vehicle is switched to one of the plurality of working channels that is occupied by the occupying unmanned vehicle systems, the first unmanned vehicle can receive the communication signal that includes the feature signal from the unmanned vehicle of the occupying unmanned vehicle system. As such, the state of the one of the plurality of working channels can be determined as the occupied state.

As another example, when the communication channel of the first unmanned vehicle is switched to one of the plurality of working channels that is not occupied, the first unmanned vehicle cannot receive the feature signal. As such, the state of the one of the plurality of working channels can be determined as the idle state.

In some embodiments, the communication channel of the first unmanned vehicle or the first control terminal can be switched back to the public channel after scanning the plurality of working channels.

Referring again to FIG. 6, at 620, the states of the plurality of working channels are transmitted to the first control terminal via a wireless communication link. In some embodiments, the first unmanned vehicle can transmit the states of the plurality of working channels to the first control terminal via the wireless communication link, after scanning the plurality of working channels. The wireless communication link refers to a wireless communication link between the first unmanned vehicle and the first control terminal.

In some other embodiments, the first control terminal can directly obtain the states of the plurality of working channels by scanning the plurality of working channels. In this way, the process at 620 can be omitted.

At 630, the states of the plurality of working channels are outputted via the first control terminal. In some embodiments, the states of the plurality of working channels can be outputted to the first user by the first control terminal through a voice output. The voice output can be generated using any suitable text-to-speech technology. For example, the voice output can be "channel 1 occupied, channel 2 occupied, . . . , channel N idle."

In some other embodiments, the states of the plurality of working channels can be displayed to the first user on a screen of the first control terminal, for example, the screen 1135 of the control terminal 113, the OHMD of the smart glasses 420, or the like.

Figure 8:
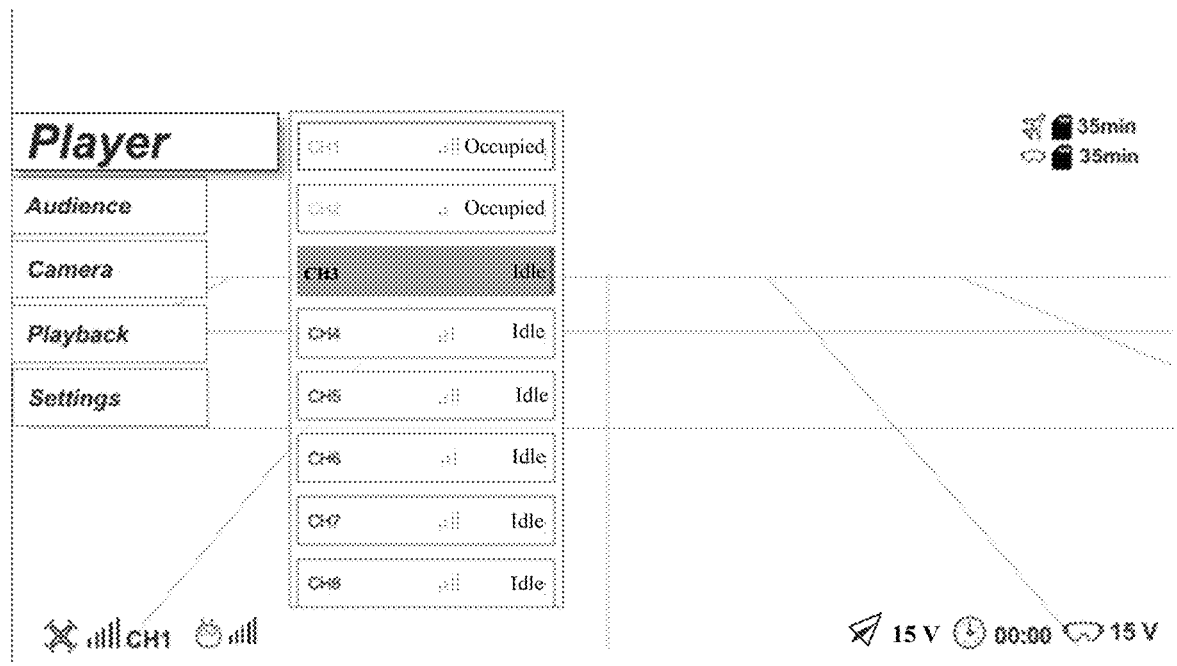
FIG. 8 is a schematic diagram of a user interface (UI) consistent with the disclosure.

FIG. 8 is a schematic diagram of an example user interface (UI) consistent with the disclosure. As shown in FIG. 8, the states of the plurality of working channels are displayed on the UI. The plurality of working channels can be listed in a column according to the numerical order. The reference numeral of each of the plurality of working channels (e.g., CH1, CH2, . . . , or CH8) can be listed in a left side of a corresponding row and the state of each of the plurality of working channels can be listed in a right side of the corresponding row. For example, as shown in FIG. 8, CH1 and CH2 are having the occupied state and CH3 to CH8 are having the idle state.

Referring again to FIG. 6, at 640, an idle one of the plurality of working channels indicated by the selection input is determined as the target channel in response to a selection input. The idle one of the plurality of working channels refers to one of the plurality of working channels having the idle states. The selection input can be inputted by the first user and indicate a selection of one of the plurality of working channels having the idle states as the target channel for the first unmanned vehicle system, such that the channel interference can be avoided.

In some embodiments, the selection input can include a voice command and the first control terminal can receive the voice command from the first user. The first control terminal can parse the content of the voice command via the speech recognition. For example, if the first user selects CH3 as the target channel, the voice command can be "select channel 3," and the first control terminal can parse the content of the voice command and highlight CH3 (as shown in FIG. 8) to indicate that the CH3 is determined as the target channel.

In some embodiments, the selection input can include the hand gestures. For example, each of the plurality of working channels can have a corresponding hand gesture, and the first control terminal can detect the hand gesture corresponding to one of the plurality of working channels made by the first user. For example, if the first user selects CH3 as the target channel, the first user can make the hand gesture corresponding to the CH3, and the first control terminal can determine the target channel by recognizing that the hand gesture is associated with the CH3.

In some embodiments, the selection input can include the eye movement. The first control terminal can detect the eye positions and eye movement of the first user. For example, if the first user selects CH3 as the target channel, the first user can move their eyes to the position of the CH3 icon on the screen of the first control terminal, for example, the OHDM of the smart glasses 420. The first control terminal can determine CH3 as the target channel by detecting that the position of the eyes is locating on the CH3 icon.

In some embodiments, the selection input can be inputted by touching the screen of the first control terminal, for example, the screen 1135 of the control terminal 113. For example, if the first user selects CH3 as the target channel, the first user can touch the CH3 icon using a finger of the first user or the stylus. The first control terminal can receive the touch signal on the CH3 icon and determine CH3 as the target channel.

In some embodiments, when none of the plurality of working channels has the idle state, the first user may abandon the selection input and keep the first unmanned vehicle system staying at the public channel to avoid channel interference. In some embodiments, the first user may input the state detection instruction to trigger another scanning of the plurality of working channels to try to find an idle one of the plurality of working channels.

At 650, the wireless communication link of the first unmanned vehicle system is switched to the target channel.

Figure 9:
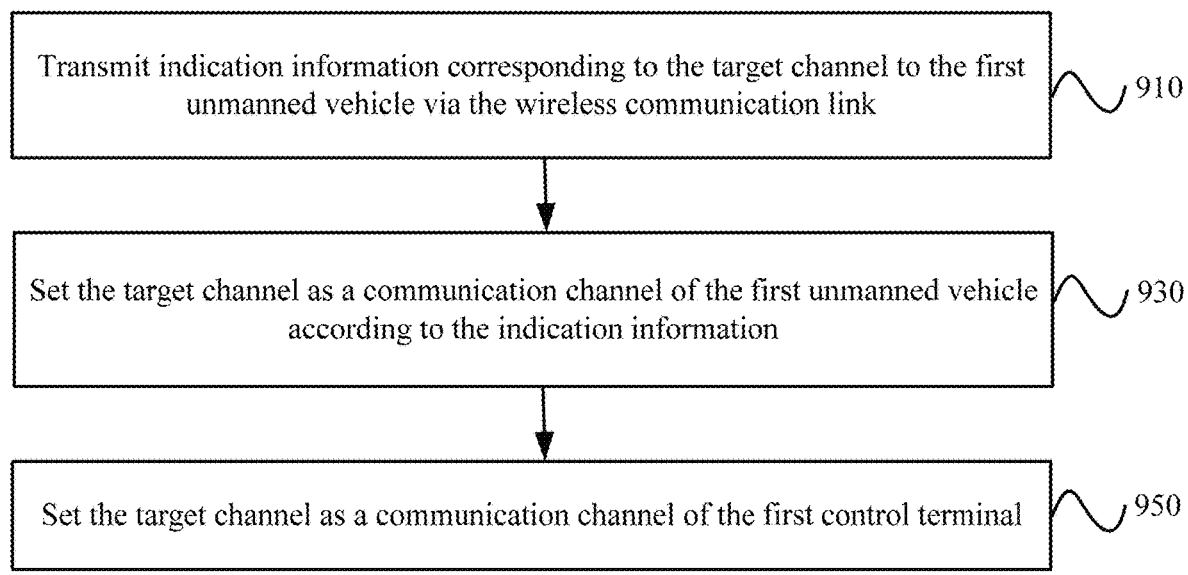
FIG. 9 is a schematic flow chart of switching a wireless communication link of a first unmanned vehicle system to a target channel consistent with the disclosure.

FIG. 9 is a schematic flow chart of switching the wireless communication link of the first unmanned vehicle system to the target channel consistent with the disclosure. As shown in FIG. 9, at 910, indication information corresponding to the target channel is transmitted to the first unmanned vehicle via the wireless communication link. The indication information can include a reference numeral (e.g., 3), a name (e.g., CH3), or other information related to the target channel. The first control terminal can transmit the indication information to the unmanned vehicle of the first unmanned vehicle via the wireless communication link. For example, the transceiver 1131 of the control terminal 113 can transmit the indication information to the transceiver 1115 of the unmanned vehicle 111 via the wireless communication link. As another example, the smart glasses 420 can transmit the indication information to the communication system 406 of the UAV 410.

At 930, the target channel is set as the communication channel of the first unmanned vehicle according to the indication information. For example, the communication channel of the transceiver 1115 of the unmanned vehicle 111 can be switched to the target channel. That is, the working frequency of the transceiver 1115 of the unmanned vehicle 111 can be tuned to the working frequency corresponding to the target channel.

At 950, the target channel is set as the communication channel of the first control terminal. For example, the communication channel of the transceiver 1131 of the control terminal 113 can be switched to the target channel. That is, the working frequency of the transceiver 1131 of the control terminal 113 can be tuned to the working frequency corresponding to the target channel.

Referring again to FIG. 6, at 660, the first unmanned vehicle is controlled to transmit the communication signal in the broadcast mode, in response to the wireless communication link of the first unmanned vehicle system being switched to the target channel. The communication signal can include the feature signal. The first unmanned vehicle can be controlled to work in the broadcast mode on the target channel, such that one of the one or more second unmanned vehicle systems can receive the feature signal on the target channel when probing the target channel to detect the state of the target channel.

Take the multi-unmanned-vehicle network including two unmanned vehicle systems (denoted as 1 and 2) operating at a same airspace as an example. When the unmanned vehicle system 1 is powered on, an unmanned vehicle of the unmanned vehicle system 1 can be triggered to scan the plurality of working channels (e.g., 1 to N) to obtain the states of the plurality of working channels. The state of each of the plurality of working channel can be determined as the idle state and displayed to a user 1 of the unmanned vehicle system 1. The user 1 can select the working channel 1 as the target channel for the unmanned vehicle system 1. The unmanned vehicle system 1 can switch its communication channel to the working channel 1 and work in the broadcast mode on the working channel 1. When the unmanned vehicle system 2 is powered on, an unmanned vehicle of the unmanned vehicle system 2 can be triggered to scan the plurality of working channels to obtain the states of the plurality of working channels. The unmanned vehicle of the unmanned vehicle system 2 can receive the communication signal that includes the feature signal sent by the unmanned vehicle of the unmanned vehicle system 1 and determine the state of working channel 1 is the occupied state. The user 2 of the unmanned vehicle system 2 can select the working channel 2 as the target channel for the unmanned vehicle system 2. The unmanned vehicle system 2 can switch its communication channel to the working channel 2 and work in the broadcast mode on the working channel 2. As such, the channel interference can be avoided.

Consistent with the disclosure, the first unmanned vehicle system of the multi-unmanned-vehicle network can scan the plurality of working channels to obtain the states of the plurality of working channels when being powered on. The plurality of working channels can be broadcast communication channels, such that the first unmanned vehicle system can receive the communication signal on the plurality of working channels to determine the states of the plurality of working channels. The occupied ones of the plurality of working channels can be avoided and an idle one of the plurality of working channels can be selected as the target channel. As such, a dynamic channel configuration can be achieved to avoid channel interference and the operation can be simple and user friendly.

Figure 10A:
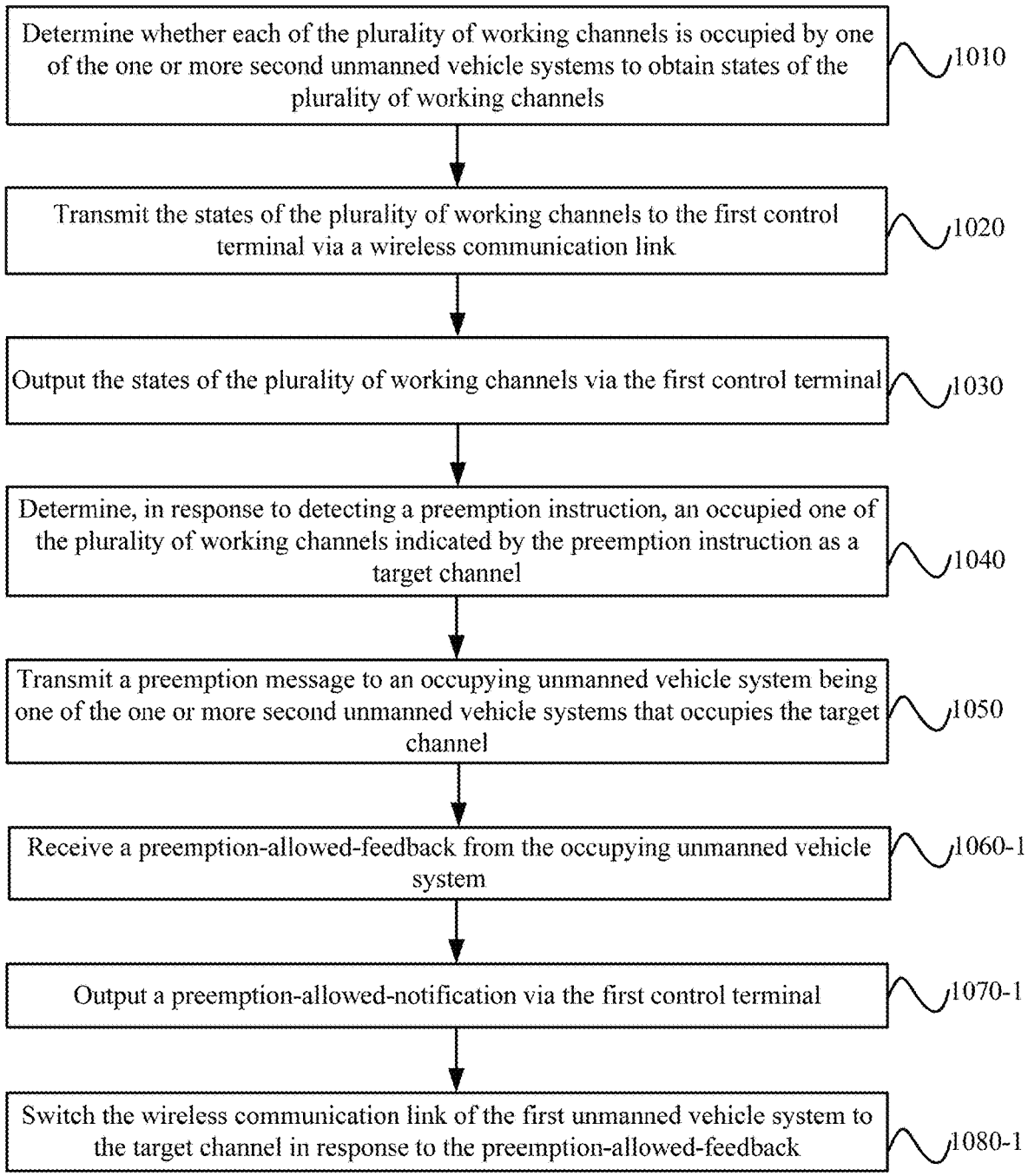
FIGS. 10A, 10B, and 10C are schematic flow charts of another method for controlling an unmanned vehicle system consistent with the disclosure.
Figure 10B:
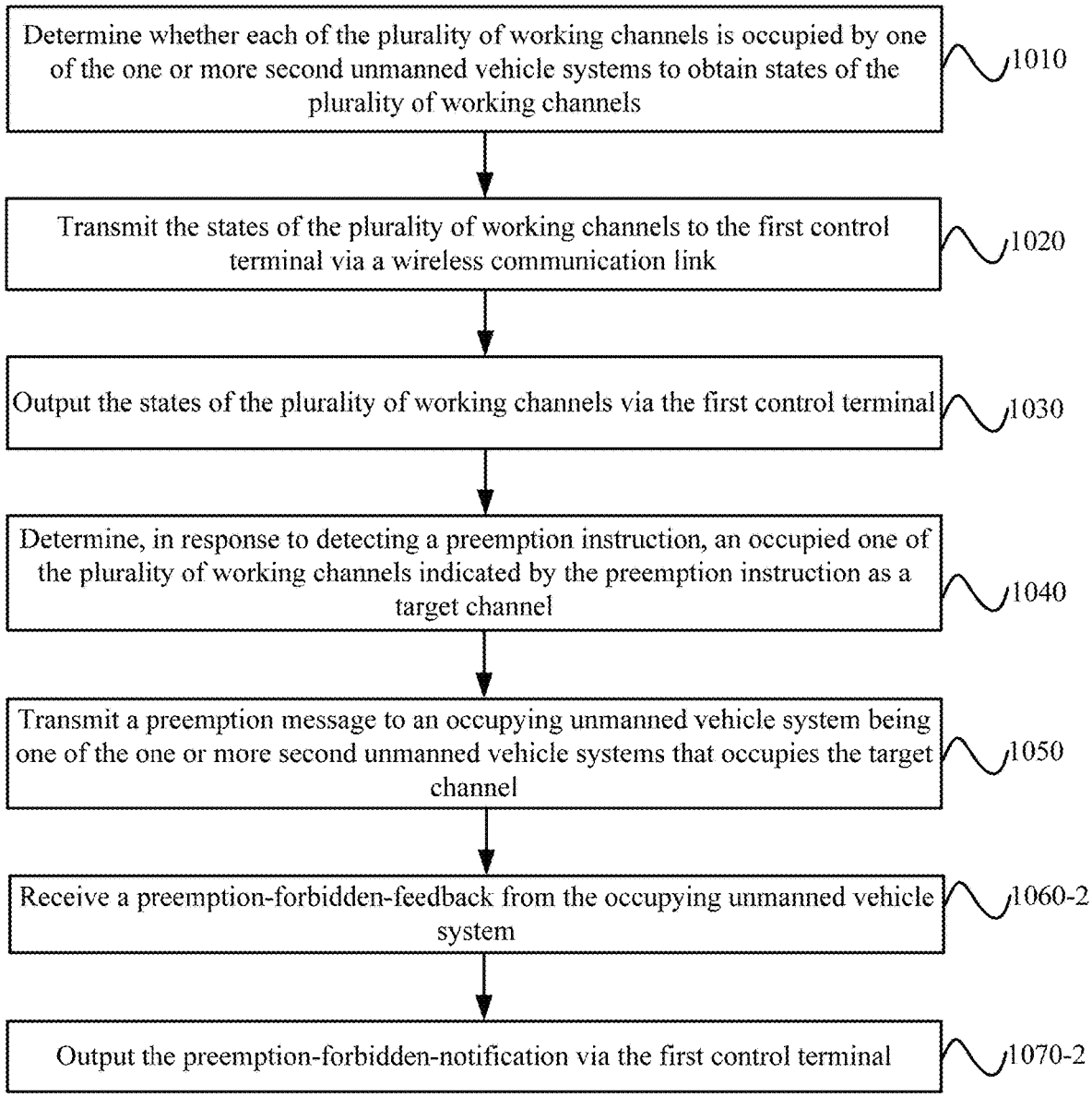
Figure 10C:
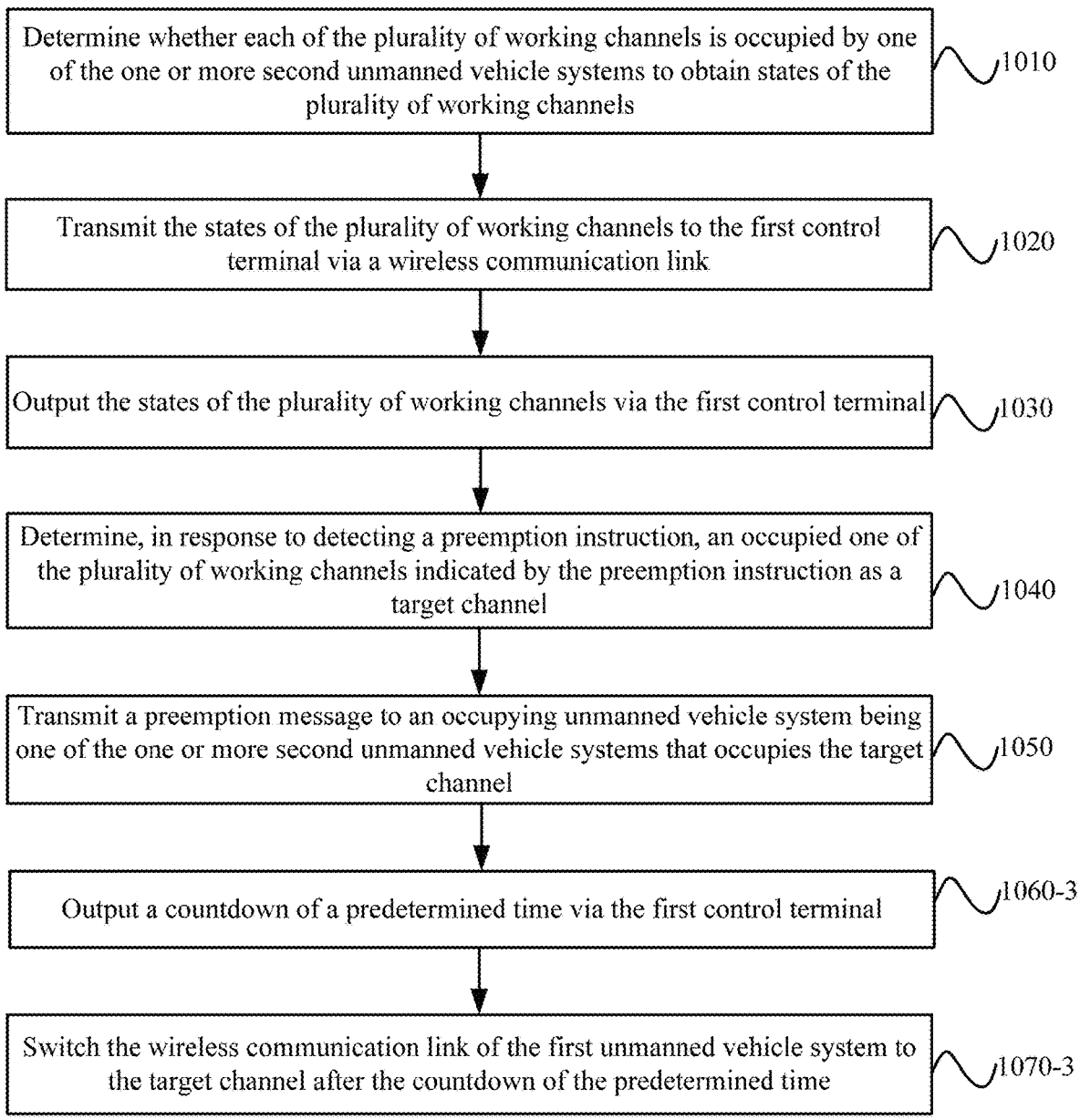

FIGS. 10A, 10B, and 10C are schematic flow charts of another method 1000 for controlling the first unmanned vehicle system consistent with the disclosure. As shown in FIGS. 10A to 10C, at 1010, the first unmanned vehicle system determines whether each of the plurality of working channels is occupied by one of the one or more second unmanned vehicle systems to obtain the states of the plurality of working channels. Each of the states can include the occupied state or the idle state.

At 1020, the states of the plurality of working channels are transmitted to the control terminal of the first unmanned vehicle system via the wireless communication link.

At 1030, the states of the plurality of working channels are outputted via the control terminal of the first unmanned vehicle system.

The processes at 1010 to 1030 are similar to the processes at 610 to 630, and detailed description thereof is omitted herein.

At 1040, an occupied one of the plurality of working channels indicated by a preemption instruction is determined as the target channel in response to detecting the preemption instruction. The occupied one of the plurality of working channels refers to one of the plurality of working channels having the occupied states. The preemption instruction can be inputted by the first user and indicate a selection of one of the plurality of working channels having the occupied states as the target channel for the first unmanned vehicle system.

In some embodiments, the preemption instruction can include a voice command and the first control terminal can receive the voice command from the first user. The first control terminal can parse the content of the voice command via the speech recognition. For example, if the first user determines to preempt CH3, the voice command can be "preempt CH3," and the first control terminal can parse the content of the voice command and highlight CH3 to indicate that the CH3 is determined as the target channel.

In some embodiments, the preemption instruction can include the hand gestures. For example, each of the plurality of working channels can have a corresponding hand gesture, and the first control terminal can detect the hand gesture corresponding to one of the plurality of working channels made by the first user. For example, if the first user determines to preempt CH3, the first user can make the hand gesture corresponding to the CH3, and the first control terminal can determine the target channel by recognizing that the hand gesture is associated with the CH3.

In some embodiments, the preemption instruction can include the eye movement. The first control terminal can detect the eye positions and eye movement of the first user. For example, if the first user determines to preempt CH3, the first user can move their eyes to the position of the CH3 icon on the screen of the first control terminal, for example, the OHDM of the smart glasses 420. The first control terminal can determine CH3 as the target channel by detecting that the position of the eyes is locating on the CH3 icon.

In some embodiments, the preemption instruction can be inputted by touching the screen of the first control terminal, for example, the screen 1135 of the control terminal 113. For example, if the first user determines to preempt CH3, the first user can touch the CH3 icon using the finger of the first user or the stylus. The first control terminal can receive the touch signal on the CH3 icon and determine CH3 as the target channel.

Figure 11A:
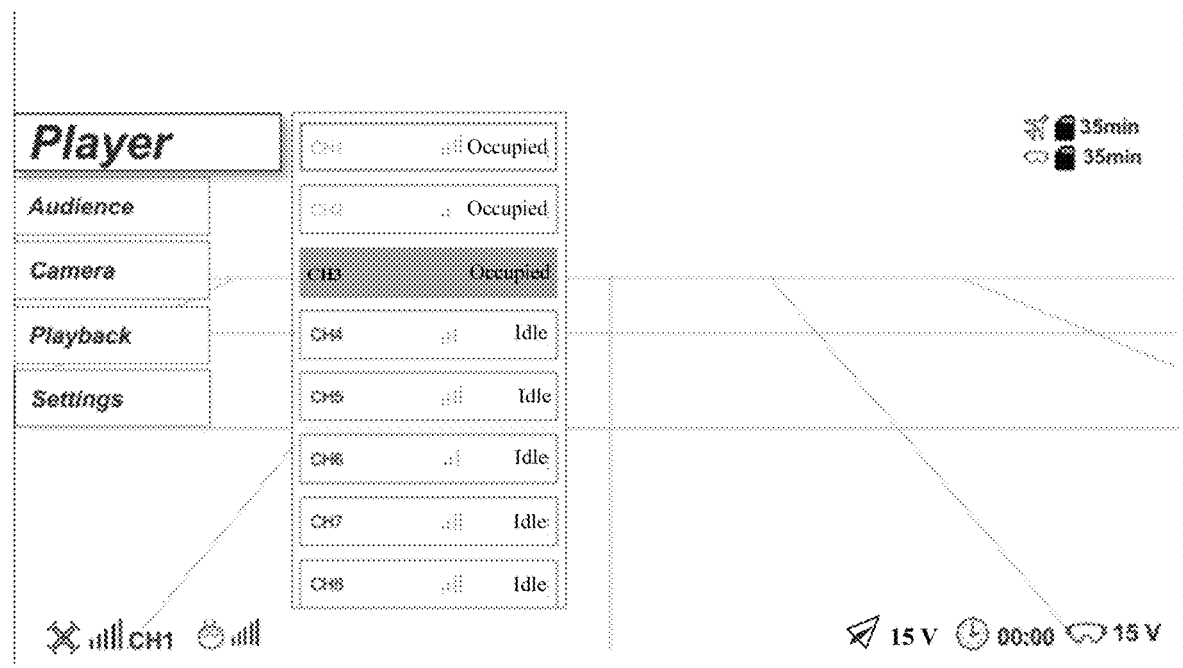
FIGS. 11A and 11B are schematic diagrams of another UI consistent with the disclosure.
Figure 11B:
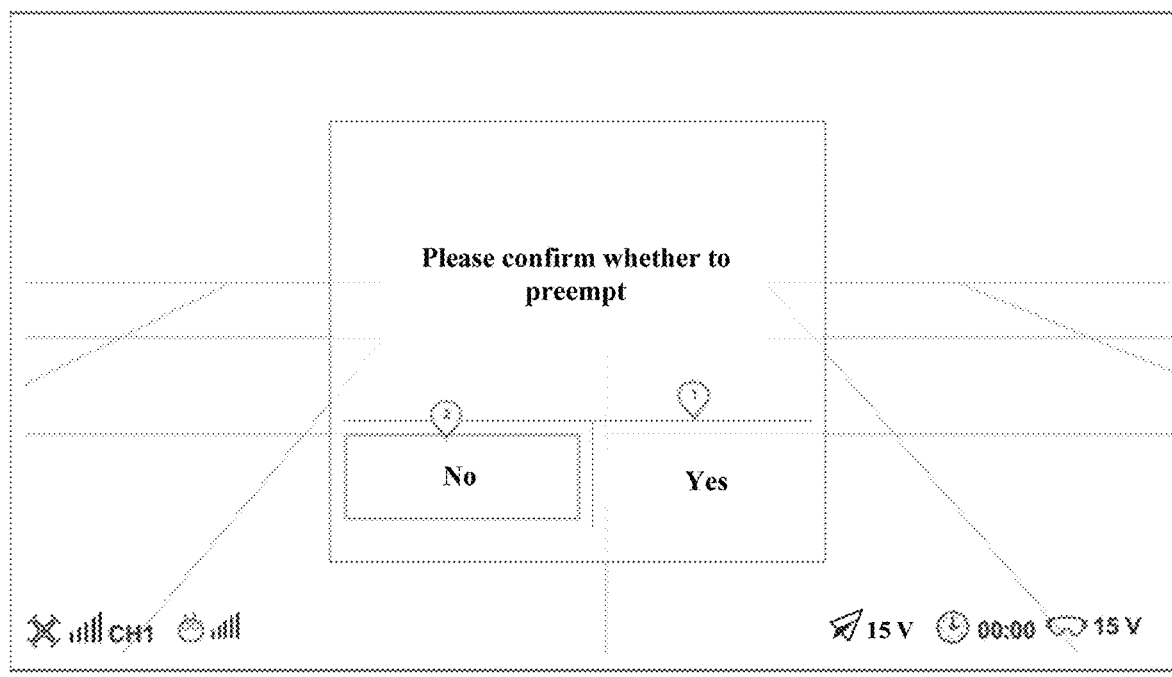

FIGS. 11A and 11B are schematic diagrams of an example UI consistent with the disclosure. As shown in FIG. 11A, the occupied working channel CH3 can be selected by the first user, for example, through touching the CH3 icon on the UI. As shown in FIG. 11B, a popup dialog can be displayed, in response to the touching operation on the CH3 icon, to let the first user to confirm whether to preempt the CH3, such that an accidental operation can be avoided. If the first user touches "yes" button, the preemption instruction can be generated, otherwise, the preemption instruction does not be generated.

At 1050, a preemption message is transmitted to the occupying unmanned vehicle system being one of the one or more second unmanned vehicle systems that occupies the target channel. The preemption message can request the occupying unmanned vehicle system to exit the target channel. In some embodiments, the preemption message can request the occupying unmanned vehicle system to switch to the public channel. In some other embodiments, the preemption message can request the occupying unmanned vehicle system to switch to another one of the plurality of working channels. The another one of the plurality of working channels can be indicated by an input to the occupying unmanned vehicle system. The input can be received by a control terminal of the occupying unmanned vehicle system from a user of the occupying unmanned vehicle system. The control terminal of the occupying unmanned vehicle system can be referred to as an occupying control terminal and the user of the occupying unmanned vehicle system can be referred to as an occupying user.

Figure 12:
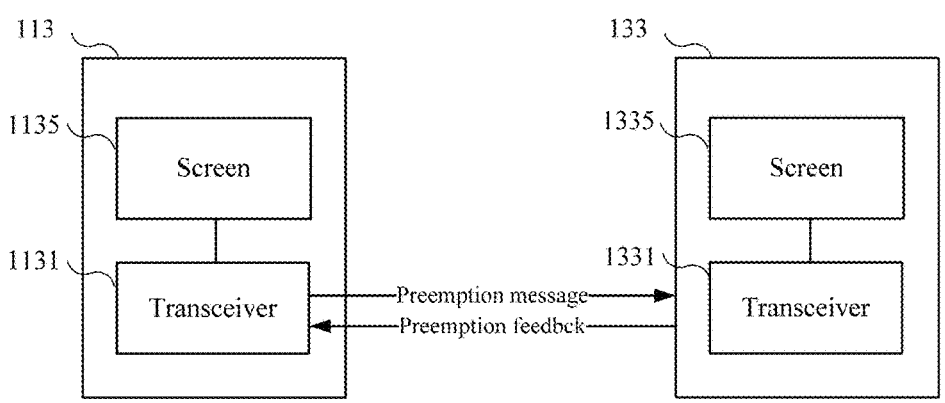
FIG. 12 schematically shows a preemption communication link consistent with the disclosure.

In some embodiments, the preemption message can include identity information of the first unmanned vehicle system and/or identity information of the first user. The identity information of the first unmanned vehicle system can include a reference numeral, a name, or any information associated with the first unmanned vehicle system. The identity information of the user of the first unmanned vehicle system can include a reference numeral, a name, or any information associated with the first user. Including the identity information of the first unmanned vehicle system and/or the first user in the preemption message can allow the occupying user to determine which one of the plurality of unmanned vehicle systems and/or which user is attempting to preempt the target working channel. The identity information can be outputted via the control terminal of the occupying unmanned vehicle system. In some embodiments, the first unmanned vehicle system can transmit the preemption message to the occupying unmanned vehicle system via a preemption communication link. FIG. 12 schematically shows an example preemption communication link consistent with the disclosure. As shown in FIG. 12, the preemption communication link can be established between the first control terminal, for example, the control terminal 113, and the occupying control terminal, for example, the control terminal 123. For example, the preemption communication link can be established between the transceiver 1131 of the control terminal 113 and a transceiver 1331 of the control terminal 123.

For example, the preemption message can be generated by the first control terminal in response to the preemption instruction. The first unmanned vehicle can not only obtain the states of the plurality of working channels, but also obtain a working frequency of the preemption communication channel of the occupying control terminal, when scanning the plurality of working channels. The first unmanned vehicle can transmit the working frequency of the preemption communication channel of the occupying control terminal to the first control terminal. Therefore, the first control terminal can switch its preemption communication channel to the working frequency of the preemption communication channel of the occupying control terminal to establish the preemption communication link between the first control terminal and the occupying control terminal. In some embodiments, the preemption communication link can be realized by time division, frequency division, or code division.

In some other embodiments, the preemption communication link can be established between the first unmanned vehicle, for example, the unmanned vehicle 111, and the occupying unmanned vehicle, for example, the unmanned vehicle 121. For example, the preemption communication link can be established between the transceiver 1113 of the unmanned vehicle 111 and a transceiver of the unmanned vehicle 121.

Figure 13:
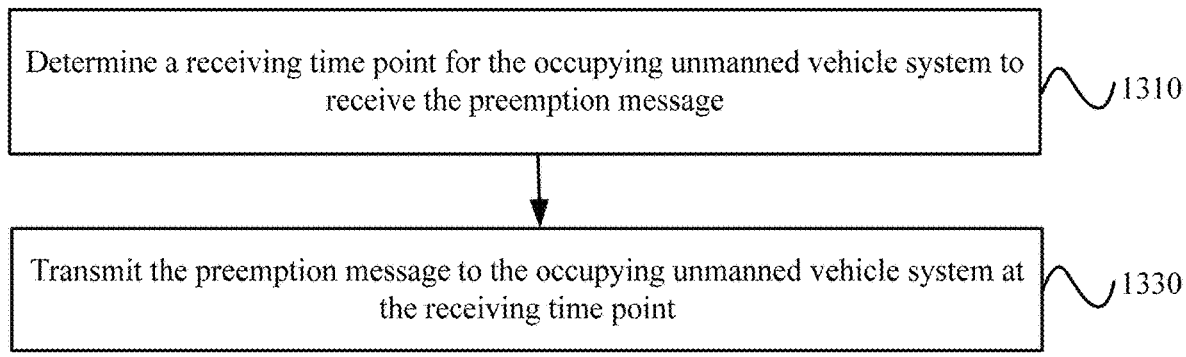
FIG. 13 is a schematic flow chart of transmitting a preemption message to an occupying unmanned vehicle system consistent with the disclosure.

FIG. 13 is a schematic flow chart of transmitting the preemption message to the occupying unmanned vehicle system consistent with the disclosure. As shown in FIG. 13, at 1310, a receiving time point for the occupying unmanned vehicle system to receive the preemption message is determined.

Figure 14:
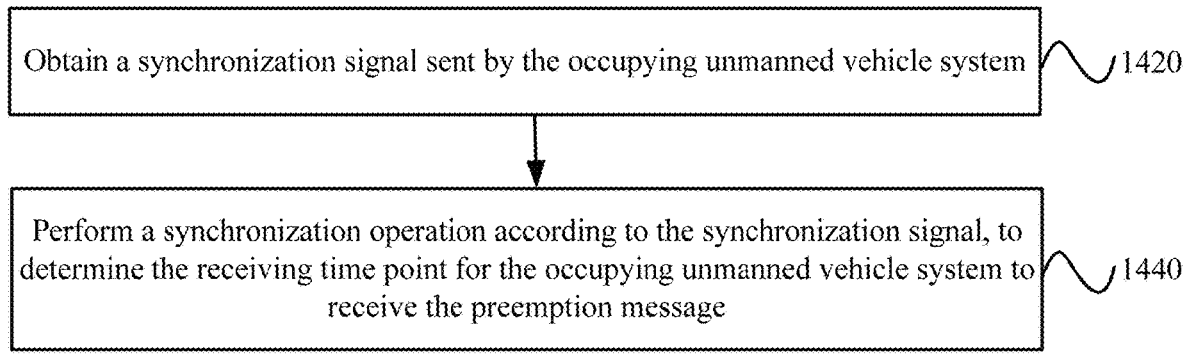
FIG. 14 is a schematic flow chart of determining a receiving time point for an occupying unmanned vehicle system to receive a preemption message consistent with the disclosure.

FIG. 14 is a schematic flow chart of determining the receiving time point for the occupying unmanned vehicle system to receive the preemption message consistent with the disclosure. As shown in FIG. 14, at 1420, a synchronization signal sent by the occupying unmanned vehicle system is obtained. In some embodiments, the synchronization signal can be sent by the occupying control terminal. The synchronization signal can use, for example, the network time protocol (NTP), the precision time protocol, the user datagram protocol (UDP), or the like. For example, if the UDP is used, the synchronization signal can include current time information of the occupying control terminal. The current time information can be the number of seconds since 00:00 (midnight) 1 Jan. 1900 GMT. In some embodiments, the synchronization signal can include the pilot sequence.

In some embodiments, the synchronization signal can be sent by the occupying control terminal once the preemption communication link is established. For example, if the preemption communication link between the first control terminal and the occupying control terminal is established, the first control terminal can receive the synchronization signal sent by the occupying control terminal the preemption communication link. In some other embodiments, the synchronization signal can be periodically sent by the occupying control terminal.

At 1440, a synchronization operation is performed according to the synchronization signal, to determine the receiving time point for the occupying unmanned vehicle system to receive the preemption message. A time difference between the first control terminal and the occupying control terminal can be calculated according to the synchronization signal. For example, the synchronization signal can include the current time information of the occupying control terminal, thus the time difference can be obtained by subtracting a current time of the occupying control terminal from a current time of the first control terminal.

The receiving time point can be calculated according to the time difference and a position of a preemption subframe in a sequence of subframes to be transmitted from the first unmanned vehicle system to the occupying unmanned vehicle system. The preemption subframe can carry the preemption message. For example, if the time difference is $t_d$, a position of a current subframe is $n_o$, the position of the preemption subframe is $n_p$, and a transmission time of one subframe is $\Delta t$, the receiving time point can be approximately equal to $t_d + (n_p - n_o) \times \Delta t$.

In some embodiments, the pilot sequence can be used as the synchronization signal. As such, the first control terminal and the occupying control terminal can be automatically synchronized when the pilot sequence is received by the first control terminal. The receiving time point can be obtained according to a relative position of the preemption subframe separated from a position of the pilot sequence in the sequence of subframes to be transmitted from the first unmanned vehicle system to the occupying unmanned vehicle system. The receiving time point can be equal to a time point corresponding to the relative position of the preemption subframe.

Referring again to FIG. 13, at 1330, the preemption message is transmitted to the occupying unmanned vehicle system at the receiving time point. In some embodiments, the preemption message can be transmitted to the occupying control terminal via the preemption communication link at the receiving time point. In some embodiments, the preemption message can be repeatedly transmitted in a preset sending time period to ensure that the occupying unmanned vehicle system can robustly receive the preemption message. For example, the preemption message can be repeatedly transmitted several times (e.g., 3, 5, or the like) in the preset sending time period.

In some embodiments, as shown in FIG. 10A, at 1060-1, the preemption-allowed-feedback is received from the occupying unmanned vehicle system. A position of an allowed-feedback subframe in a sequence of subframes to be received from the occupying control terminal can be determined according to the synchronization operation. For example, when the pilot sequence is used as the synchronization signal, the position of the allowed-feedback subframe can be calculated according to a relative position of the allowed-feedback subframe separated from the position of the pilot sequence in the sequence of subframes to be transmitted from the first unmanned vehicle system to the occupying unmanned vehicle system.

The allowed-feedback subframe can carry the preemption-allowed-feedback. In some embodiments, the preemption-allowed-feedback can be received from the occupying control terminal via the preemption communication link at the allowed-feedback subframe. In some other embodiments, the preemption-allowed-feedback can be repeatedly received from the occupying control terminal until an earlier one of an end of a preset receiving time period, and a detection of the preemption-allowed-feedback at the allowed-feedback subframe.

In some embodiments, the preemption-allowed-feedback can be generated by the occupying unmanned vehicle system in response to a preemption-allowed-input to the occupying unmanned vehicle system. For example, the preemption-allowed-input can be inputted by the occupying user, and indicate that the occupying user agrees to a request of the preemption message. In some other embodiments, the preemption-allowed-feedback can be automatically generated by the occupying control terminal in response to the preemption message.

In some embodiments, the preemption-allowed-feedback can be generated by the occupying unmanned vehicle system in response to the occupying unmanned vehicle system not being in a preset operation mode. The preset operation mode can be, for example, a takeoff mode, a landing mode, or the like. When the occupying unmanned vehicle system is taking off or is landing, controlling the occupying unmanned vehicle system to exit the target channel may cause the occupying unmanned vehicle to be crashed. As such, when the occupying unmanned vehicle system is in the preset operation mode, the preemption message can be ignored and the preemption-allowed-feedback does not be generated.

At 1070-1, a preemption-allowed-notification is outputted via the first control terminal. The preemption-allowed-notification can be generated by the first control terminal in response to the preemption-allowed-feedback and can be outputted to the first user via the first control terminal. In some embodiments, the preemption-allowed-notification can be outputted to the first user by the first control terminal through a voice output. The voice output can be generated using any suitable text-to-speech technology. For example, the voice output can be "preemption request approved."

In some other embodiments, the preemption-allowed-notification can be displayed to the first user on the screen of the first control terminal, for example, the screen 1135 of the control terminal 113, the OHMD of the smart glasses 420, or the like. For example, a popup dialog can be displayed to show the preemption-allowed-notification, for example, "preemption request of CH3 is approved," on the screen of the first control terminal.

Figure 15:
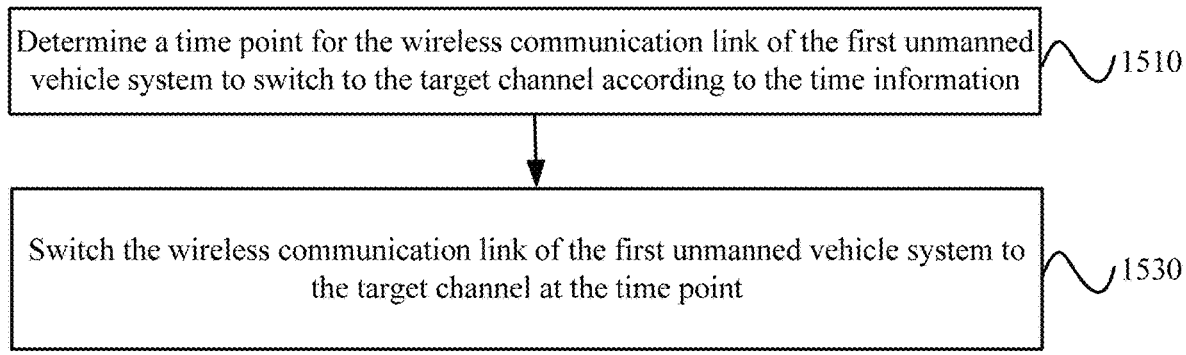
FIG. 15 is another schematic flow chart of switching a wireless communication link of a first unmanned vehicle system to a target channel consistent with the disclosure.

At 1080-1, the wireless communication link of the first unmanned vehicle system is switched to the target channel in response to the preemption-allowed-feedback. In some embodiments, the preemption-allowed-feedback can include time information. FIG. 15 is an example schematic flow chart of switching the wireless communication link of the first unmanned vehicle system to the target channel consistent with the disclosure. As shown in FIG. 15, at 1510, a time point for the wireless communication link of the first unmanned vehicle system to switch to the target channel is determined according to the time information.

In some embodiments, the time information can include a switching time of the first unmanned system $t_s$. The time point can be calculated according to the time difference $\Delta t$ between the first control terminal and the occupying control terminal and the switching time $t_s$. For example, the time point can be approximately equal to $\Delta t$ adds $t_s$. In some other embodiments, the time information can include a relative position of a switching subframe of the first unmanned system separated from the pilot sequence. The time point can be calculated as a time point corresponding to the relative position of the switching subframe of the first unmanned system.

The time point can be referred to as a first time point. The first time point is no earlier than a second time point at which the occupying unmanned vehicle system exits the target channel to ensure a safety switching. In some other embodiments, the time information can include the second time point. The first time point can be calculated according to the time difference $\Delta t$, the second time point $t_2$, and a safety time interval $\Delta t_s$. For example, the first time point can be approximately equal to a sum of $\Delta t$, $t_s$, and $\Delta t_s$.

At 1530, the wireless communication link of the first unmanned vehicle system is switched to the target channel at the time point. The process at 1530 is similar to the process at the process at 650, and detailed description thereof is omitted herein.

In some embodiments, as shown in FIG. 10B, at 1060-2, the preemption-forbidden-feedback is received from the occupying unmanned vehicle system. A position of a forbidden-feedback subframe in the sequence of subframes to be received from the occupying control terminal can be determined. The forbidden-feedback subframe can carry the preemption-forbidden-feedback. In some embodiments, the preemption-forbidden-feedback can be received by the first control terminal from the occupying control terminal via the preemption communication link. In some other embodiments, the preemption-forbidden-feedback can be repeatedly received from the occupying control terminal until an earlier one of an end of the preset receiving time period, and a detection of the preemption-forbidden-feedback at the forbidden-feedback subframe. In some embodiments a structure of the preemption-forbidden-feedback subframe can be the same with as a structure of the preemption-allowed-feedback subframe. The field in the preemption-forbidden-feedback subframe that contains the preemption-forbidden-feedback can be the same as the field in the preemption-allowed-feedback subframe that contains the preemption-allowed-feedback.

In some embodiments, the preemption-forbidden-feedback can be generated by the occupying unmanned vehicle system in response to a preemption-forbidden-input to the occupying unmanned vehicle system. For example, the preemption-forbidden-input can be inputted by the occupying user, and indicate that the occupying user does not approve the request of the preemption message.

In some embodiments, the preemption-forbidden-feedback can be generated by the occupying unmanned vehicle system in response to the occupying unmanned vehicle system being in the preset operation mode. The preset operation mode can be, for example, the takeoff mode, the landing mode, or the like. When the occupying unmanned vehicle system is taking off or is landing, controlling the occupying unmanned vehicle system to exit the target channel may cause the occupying unmanned vehicle to be crashed. As such, when the occupying unmanned vehicle system is in the preset operation mode, the preemption-forbidden-feedback can be generated.

At 1070-2, a preemption-forbidden-notification is outputted via the first control terminal. The preemption-forbidden-notification can be outputted to the first user via the first control terminal. In some embodiments, the preemption-forbidden-notification can be outputted to the first user by the first control terminal through a voice output. The voice output can be generated using any suitable text-to-speech technology. For example, the voice output can be "preemption request forbidden."

Figure 16:
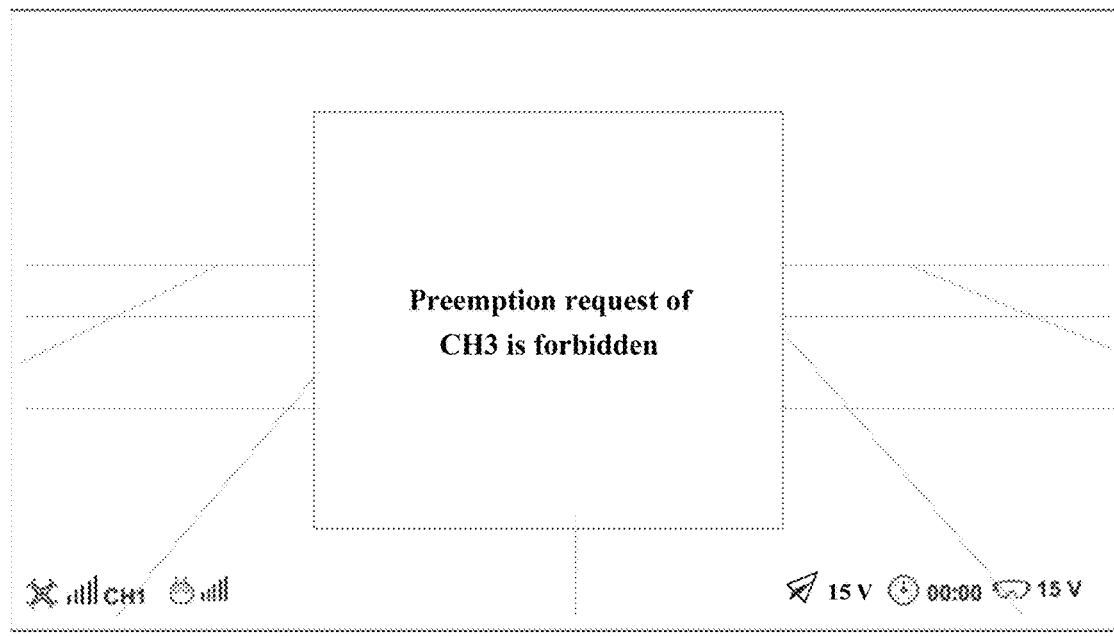
FIG. 16 is schematic diagram of another UI consistent with the disclosure.

In some other embodiments, the preemption-forbidden-notification can be displayed to the first user on the screen of the first control terminal, for example, the screen 1135 of the control terminal 113, the OHMD of the smart glasses 420, or the like. FIG. 16 is schematic diagram of an example UI consistent with the disclosure. As shown in FIG. 16, a popup dialog can be displayed to show the preemption-forbidden-notification, for example, "preemption request of CH3 is forbidden," on the screen.

In some embodiments, as shown in FIG. 10C, at 1060-3, a countdown of a predetermined time is outputted via the first control terminal. The first unmanned vehicle system can be switched to the target channel after the countdown of the predetermined time. As such, the countdown of the predetermined time can provide the occupying unmanned vehicle system enough time to exit the target channel.

In some embodiment, the countdown of the predetermined time can be outputted to the first user by the first control terminal through a voice output. The voice output can be generated using any suitable text-to-speech technology. For example, the voice output can be "10, 9, 8, . . . , 1."

In some other embodiments, the countdown of the predetermined time can be displayed to the first user on the screen of the first control terminal, for example, the screen 1135 of the control terminal 113, the OHMD of the smart glasses 420, or the like.

In some embodiments, the first user can cancel the preemption operation any time within the countdown of the predetermined time. A preemption cancel message can be generated by the first control terminal and transmit to the occupying unmanned vehicle system.

At 1070-3, the wireless communication link of the first unmanned vehicle system is switched to the target channel after the countdown of the predetermined time. The process at 1070-3 is similar to the process at the process at 650, and detailed description thereof is omitted herein.

In some embodiments, the wireless communication link of the first unmanned vehicle system is switched to the target channel, in response to receiving the preemption-allowed-feedback within the countdown of the predetermined time. The predetermined time discussed above can also be referred to as a first predetermined time.

Consistent with the disclosure, a point-to-point transmission of the preemption message and preemption feedback between the first unmanned vehicle system and the occupying unmanned vehicle system can be realized, and the occupying unmanned vehicle system can exit the target channel before the first unmanned vehicle system switches to the target channel, such that the problem of channel interference during the channel preemption can be solved and the operation can be simple and user friendly.

Figure 17A:
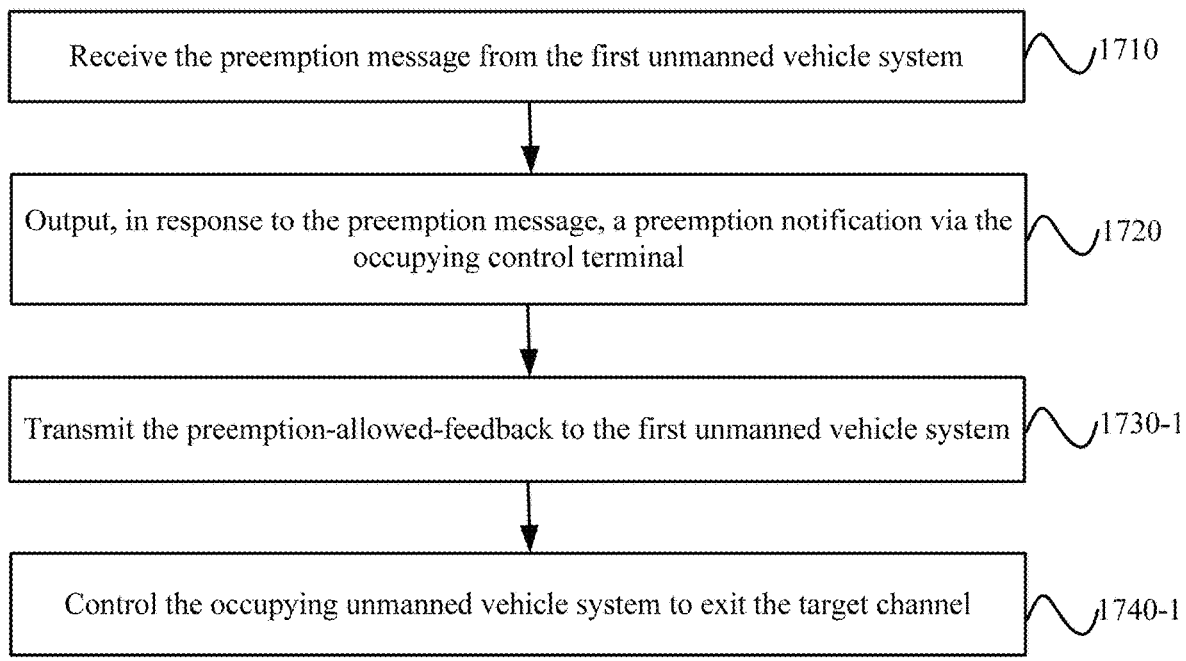
FIGS. 17A, 17B, and 17C are schematic flow charts of a method for controlling an occupying unmanned vehicle system consistent with the disclosure.
Figure 17B:
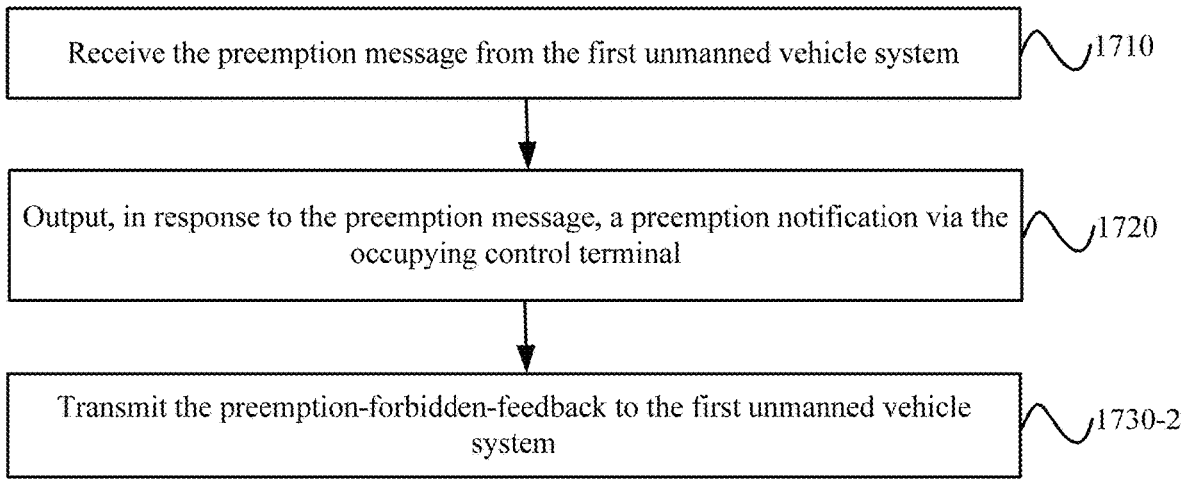
Figure 17C:
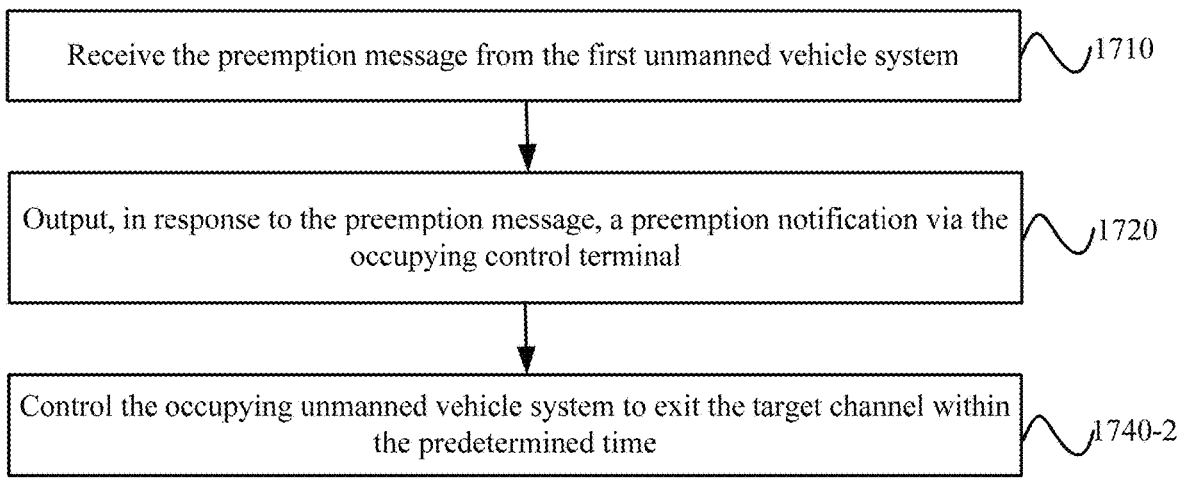

FIGS. 17A, 17B, and 17C are schematic flow charts of a method for controlling the occupying unmanned vehicle system consistent with the disclosure. The occupying unmanned vehicle system can be any one of the one or more second unmanned vehicle systems, for example, the unmanned vehicle system 130.

As shown in FIGS. 17A to 17C, at 1710, the preemption message is received from the first unmanned vehicle system. The preemption message can request the occupying unmanned vehicle system occupying the target channel of the first unmanned vehicle system to exit the target channel. In some embodiments, the preemption message can request the occupying unmanned vehicle system to switch to the public channel. In some other embodiments, the preemption message can request the occupying unmanned vehicle system to switch to another one of the plurality of working channels. The another one of the plurality of working channels can be indicated by the input to the occupying unmanned vehicle system. In some embodiments, the preemption message can include the identity information of the first unmanned vehicle system and/or the identity information of a user of the first unmanned vehicle system.

At 1720, a preemption notification is outputted via the occupying control terminal in response to the preemption message. In some embodiments, the preemption notification can be outputted to the occupying user by the occupying control terminal through a voice output. The voice output can be generated using any suitable text-to-speech technology. For example, the voice output can be "a preemption request received from user 1."

In some other embodiments, the preemption notification can be displayed to the occupying user on the screen of the occupying control terminal. For example, a popup dialog can be displayed to show the preemption notification, for example, "a preemption request received from user 1," on the screen of the occupying control terminal.

In some embodiments, as shown in FIG. 17A, at 1730-1, the preemption-allowed-feedback is transmitted to the first unmanned vehicle system. The position of the allowed-feedback subframe in a sequence of subframes to be transmitted from the occupying control terminal can be determined. In some embodiments, the preemption-allowed-feedback can be transmitted to the first control terminal at the allowed-feedback subframe by the occupying control terminal via the preemption communication link between the first control terminal and the occupying control terminal, such that the first unmanned vehicle system can output the preemption-allowed-notification via the first control terminal of the first unmanned vehicle system. In some other embodiments, the preemption-allowed-feedback can be repeatedly transmitted to the first control terminal within the preset receiving time period to ensure that the first unmanned vehicle system can robustly receive the allowed-feedback subframe.

In some embodiments, the preemption-allowed-feedback can be generated in response to a preemption-allowed-input to the occupying unmanned vehicle system. The preemption-allowed-input can be inputted to the occupying control terminal by the occupying user and indicate an approve of the request of the preemption message by the occupying user. In some embodiments, the preemption-allowed-feedback can be generated in response to the occupying unmanned vehicle system not being in the preset operation mode. The preset operation mode can be, for example, a takeoff mode, a landing mode, or the like.

In some embodiments, the preemption-allowed-feedback can include time information, the time information indicating the first time point for the wireless communication link of the first unmanned vehicle system to switch to the target channel.

At 1740-1, the occupying unmanned vehicle system is controlled to exit the target channel. The occupying unmanned vehicle system can be controlled to switch from the target channel to another working channel at the second time point. The second time point is not later than the first time point to ensure that the occupying unmanned vehicle system can exit the target channel before the first unmanned vehicle switched to the target channel.

In some embodiments, the another working channel can be the public channel. In some other embodiments, the another working channel can be indicated by the input to the occupying unmanned vehicle system. The input can be received by the occupying control terminal from the occupying user. In some embodiments, the input can include a voice command, the hand gestures, the eye movement, or the like. In some embodiments, the input can be inputted by touching the screen of the occupying control terminal.

For example, channel information corresponding to the public channel or the another working channel can be transmitted to the occupying unmanned vehicle via a wireless communication link between the occupying control terminal and the occupying unmanned vehicle. The channel information can include a reference numeral, a name, or other information related to the public channel or the another working channel. The public channel or the another working channel can be set as a communication channel of the occupying unmanned vehicle according to the channel information. The public channel or the another working channel can be set as a communication channel of the occupying control terminal.

In some embodiments, as shown in FIG. 17B, at 1730-2, the preemption-forbidden-feedback is transmitted to the first unmanned vehicle system. The position of the forbidden-feedback subframe in a sequence of subframes to be transmitted from the occupying control terminal can be determined. In some embodiments, the preemption-forbidden-feedback can be transmitted to the first control terminal at the forbidden-feedback subframe by the occupying control terminal via the preemption communication link between the first control terminal and the occupying control terminal, such that the first unmanned vehicle system can output the preemption-forbidden-notification via the first control terminal of the first unmanned vehicle system. In some other embodiments, the preemption-forbidden-feedback can be repeatedly transmitted to the first control terminal within the preset receiving time period to ensure that the first unmanned vehicle system can robustly receive the forbidden-feedback subframe. In some embodiments the forbidden-feedback subframe and the allowed-feedback subframe can be the same subframe.

In some embodiments, the preemption-forbidden-feedback can be generated by the occupying unmanned vehicle system in response to a preemption-forbidden-input to the occupying unmanned vehicle system. For example, the preemption-forbidden-input can be inputted by the occupying user, and indicate that the occupying user does not approve the request of the preemption message. In some embodiments, the preemption-forbidden-feedback can be generated by the occupying unmanned vehicle system in response to the occupying unmanned vehicle system being in the preset operation mode. The preset operation mode can be, for example, the takeoff mode, the landing mode, or the like.

In some embodiment, the preemption message can include a second predetermined time. As shown in FIG. 17C, at 1740-2, the occupying unmanned vehicle system can be controlled to exit the target channel within the second predetermined time.

In some embodiments, a countdown of the second predetermined time can be outputted via the occupying control terminal. The occupying user can select another one of the plurality of working channel and control the occupying unmanned vehicle system to switch to the another one of the plurality of working channel within the second predetermined time. The preemption-allowed feedback can be generated in response to the occupying unmanned vehicle system being switched to the another one of the plurality of working channel, and transmitted to the first unmanned vehicle system.

In some embodiments, if the occupying user does not control the occupying unmanned vehicle system to switch to the another one of the plurality of working channel within the second predetermined time, the occupying unmanned vehicle system can be automatically switched to the public channel or one of the idle working channels, and automatically generate and transmit the preemption-allowed feedback to the first unmanned vehicle system.

Figure 18:
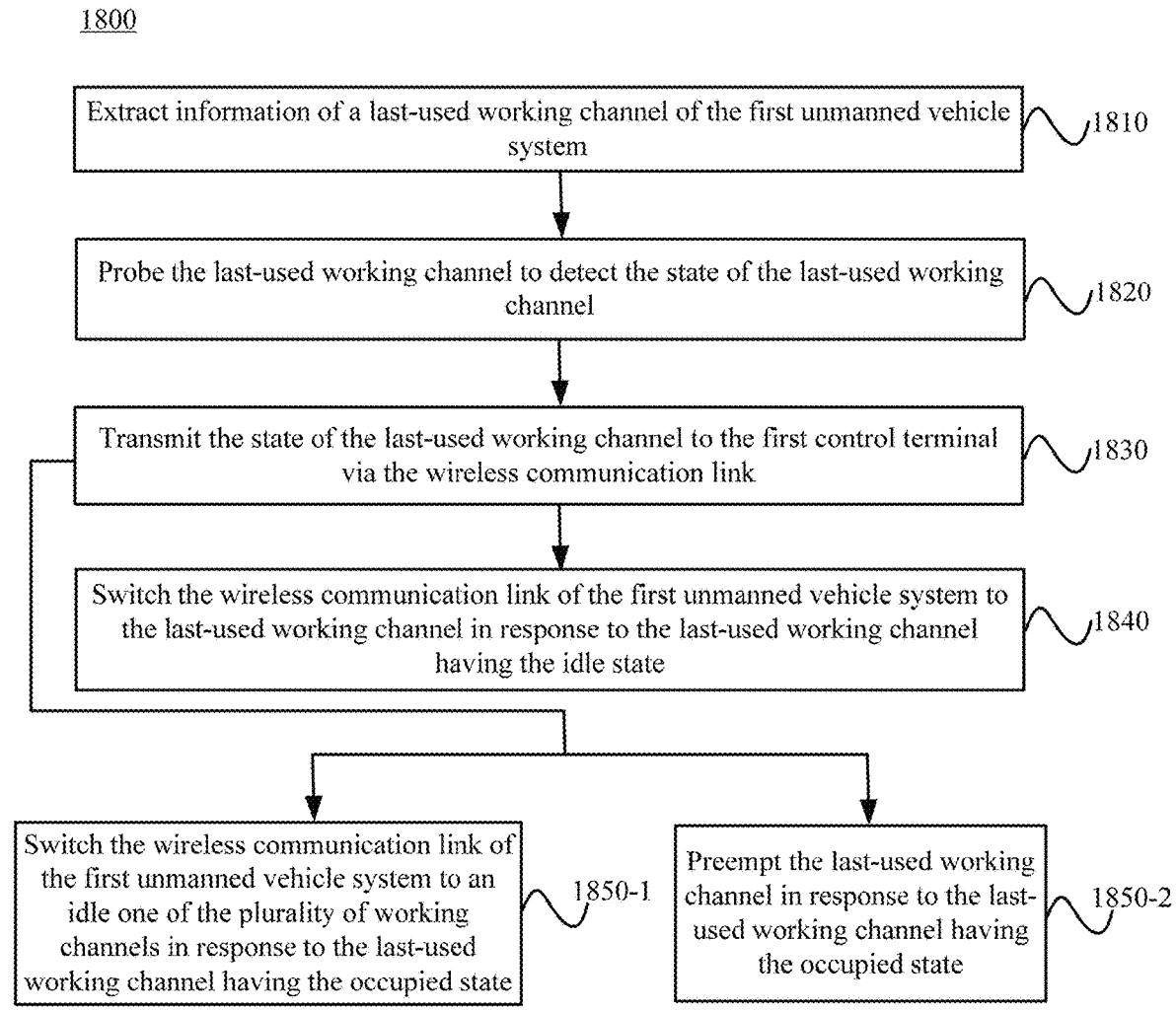
FIG. 18 is a schematic flow chart of another method for controlling an unmanned vehicle system consistent with the disclosure.

FIG. 18 is a schematic flow chart of an example method for controlling the first unmanned vehicle system consistent with the disclosure. As shown in FIG. 18, at 1810, the information of the last-used working channel of the first unmanned vehicle system is extracted. The last-used working channel refers to one of the plurality of working channels that is last used by the first unmanned vehicle system before reboot or switching to the public channel. The information of the last-used working channel can include a reference numeral, a name, or other information associated with the last-used working channel. The information of the last-used working channel can be stored in a memory of the first unmanned vehicle and/or a memory of the first control terminal.

At 1820, the last-used working channel is probed to detect the state of the last-used working channel. The state of the last-used working channel can include the occupied state and the idle state. In some embodiments, the last-used working channel can be probed in response to detecting that the first unmanned vehicle system is powered on. In some other embodiments, the last-used working channel can be probed in response to a probe instruction.

In some embodiments, the communication channel of the first unmanned vehicle or the first control terminal can be switched to the last-used working channel. The state of the last-used working channel can be determined through detecting whether the feature signal satisfying the preset requirement is received on the last-used working channel. In some embodiments, the feature signal can include the pilot sequence.

In some embodiments, the communication channel of the first unmanned vehicle or the first control terminal can be switched back to the public channel after probing the last-used working channel.

At 1830, the state of the last-used working channel is transmitted to the first control terminal via the wireless communication link. In some embodiments, the first unmanned vehicle can transmit the state of the last-used working channel to the first control terminal via the wireless communication link, after probing the last-used working channel. In some other embodiments, the first control terminal can directly obtain the state of the last-used working channel by probing the last-used working channel. In this way, the process at 1830 can be omitted.

At 1840, the wireless communication link of the first unmanned vehicle system is switched to the last-used working channel in response to the last-used working channel having the idle state. That is, if the state of the last-used working channel is the idle state, the wireless communication link of the first unmanned vehicle system can be switched to the last-used working channel. The process at 1840 is similar to the process at 650, and detailed description thereof is omitted herein.

In some embodiments, at 1850-1, the wireless communication link of the first unmanned vehicle system is switched to an idle one of the plurality of working channels in response to the last-used working channel having the occupied state. That is, if the state of the last-used working channel is the occupied state, the wireless communication link of the first unmanned vehicle system can be switched to an idle one of the plurality of working channels, such that the channel interference can be avoided. The process at 1850-1 is similar to the method 600 in FIG. 6, and detailed description thereof is omitted herein.

In some embodiments, at 1850-2, the last-used working channel is preempted in response to the last-used working channel having the occupied state. That is, if the state of the last-used working channel is the occupied state, the wireless communication link of the first unmanned vehicle system can be preempt the last-used working channel by switching to last-used working channel. The process at 1850-2 is similar to the method 1000 in FIGS. 10A to 10C, and detailed description thereof is omitted herein.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method comprising:
   determining, by a control terminal of a first vehicle system, whether each of a plurality of working channels is occupied by one of one or more second vehicle systems to obtain states of the plurality of working channels, each of the states including an occupied state or an idle state, the first vehicle system further including a vehicle, the control terminal being separate from the vehicle and configured to communicate with the vehicle, and the plurality of working channels being in a working frequency band of a multi-vehicle network including the first vehicle system and the one or more second vehicle systems; and
   outputting the states of the plurality of working channels to a user via the control terminal of the first vehicle system.

2. The method of claim 1, wherein outputting the states of the plurality of working channels includes:
   controlling a user interface of the control terminal of the first vehicle system to display the states of the plurality of working channels.

3. The method of claim 1, wherein determining whether each of the plurality of working channels is occupied by one of the one or more second vehicle systems includes:
   determining whether each of the plurality of working channels is occupied by one of the one or more second vehicle systems through detecting whether a feature signal satisfying a preset requirement is received on each of the plurality of working channels, the feature signal including a predesigned sequence having a structure known by the first vehicle system and the one or more second vehicle systems.

4. The method of claim 3, wherein the feature signal is sent by a vehicle or a control terminal of one of the one or more second vehicle systems.

5. The method of claim 1, wherein determining whether each of the plurality of working channels is occupied by one of the one or more second vehicle systems includes:
   determining whether each of the plurality of working channels is occupied by one of the one or more second vehicle systems in response to detecting that the first vehicle system is powered on or a state detection instruction is input.

6. The method of claim 1, further comprising:
   determining, in response to a selection input, an idle one of the plurality of working channels indicated by the selection input as a target channel; and
   switching a wireless communication link of the first vehicle system to the target channel.

7. The method of claim 6, wherein switching the wireless communication link to the target channel includes:
   transmitting indication information corresponding to the target channel to the vehicle of the first vehicle system via the wireless communication link, the indication information including at least one of a reference numeral, a name, or other information related to the target channel;
   setting the target channel as a communication channel of the vehicle according to the indication information; and
   setting the target channel as a communication channel of the control terminal of the first vehicle system.

8. The method of claim 1, further comprising:
   determining, in response to detecting a preemption instruction, an occupied one of the plurality of working channels indicated by the preemption instruction as a target channel;
   transmitting a preemption message to an occupying vehicle system being one of the one or more second vehicle systems that occupies the target channel, the preemption message requesting the occupying vehicle system to exit the target channel; and
   switching a wireless communication link of the first vehicle system to the target channel.

9. The method of claim 8, further comprising:
   receiving a preemption-allowed-feedback from the occupying vehicle system;
   wherein switching the wireless communication link of the first vehicle system to the target channel includes:
      switching the wireless communication link of the first vehicle system to the target channel in response to the preemption-allowed-feedback.

10. The method of claim 9, further comprising:
    outputting a preemption-allowed-notification via the control terminal of the first vehicle system.

11. The method of claim 9, wherein the preemption-allowed-feedback is generated by the occupying vehicle system in response to a preemption-allowed-input to the occupying vehicle system or in response to the occupying vehicle system not being in a preset operation mode.

12. The method of claim 8, further comprising:
    receiving a preemption-forbidden-feedback from the occupying vehicle system; and
    outputting, in response to the preemption-forbidden-feedback, a preemption-forbidden-notification via the control terminal of the first vehicle system.

13. The method of claim 12, wherein the preemption-forbidden-feedback is generated by the occupying vehicle system in response to a preemption-forbidden-input to the occupying vehicle system or in response to the occupying vehicle system being in a preset operation mode.

14. The method of claim 8, wherein switching the wireless communication link of the first vehicle system to the target channel includes:
    switching the wireless communication link of the first vehicle system to the target channel at a first time point not earlier than a second time point at which the occupying vehicle system exits the target channel.

15. The method of claim 8, wherein the preemption message requests the occupying vehicle system to switch to another one of the plurality of working channels.

16. The method of claim 15, wherein the another one of the plurality of working channels is a public channel.

17. The method of claim 8, wherein transmitting the preemption message to the occupying vehicle system includes:
    determining a receiving time point for the occupying vehicle system to receive the preemption message; and
    transmitting the preemption message to the occupying vehicle system at the receiving time point.

18. The method of claim 17, wherein determining the receiving time point includes:
    obtaining a synchronization signal sent by the occupying vehicle system; and
    performing a synchronization operation according to the synchronization signal, to determine the receiving time point for the occupying vehicle system to receive the preemption message.

19. A system comprising:
one or more processors included in a control terminal of a first vehicle system, the first vehicle system further including a vehicle, and the control terminal being separate from the vehicle and configured to communicate with the vehicle; and
one or more memories included in the control terminal of the first vehicle system and coupled to the one or more processors, the one or more memories storing instructions that, when executed by the one or more processors, cause the one or more processors to:
  determine whether each of a plurality of working channels is occupied by one of one or more second vehicle systems to obtain states of the plurality of working channels, each of the states including an occupied state or an idle state, and the plurality of working channels being in a working frequency band of a multi-vehicle network including the first vehicle system and the one or more second vehicle systems; and
  output the states of the plurality of working channels to a user via the control terminal of the first vehicle system.

\* \* \* \* \*